(12) United States Patent
Raghavan et al.

(10) Patent No.: US 8,726,281 B2
(45) Date of Patent: May 13, 2014

(54) METHOD AND SYSTEM FOR IMPROVING PERFORMANCE AND REDUCING ENERGY CONSUMPTION BY CONVERTING A FIRST PROGRAM CODE INTO A SECOND PROGRAM CODE AND IMPLEMENTING SIMD

(75) Inventors: Praveen Raghavan, Tamil Nady (IN); David Novo Bruna, Barcelona (ES); Francky Catthoor, Temse (BE); Angeliki Krithikakou, Piraeus (GR)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 646 days.

(21) Appl. No.: 12/869,610

(22) Filed: Aug. 26, 2010

(65) Prior Publication Data
US 2011/0055836 A1 Mar. 3, 2011

Related U.S. Application Data

(60) Provisional application No. 61/238,389, filed on Aug. 31, 2009.

(51) Int. Cl.
*G06F 9/46* (2006.01)
(52) U.S. Cl.
USPC ........................................................ 718/101
(58) Field of Classification Search
USPC ........................................... 718/101; 712/22
See application file for complete search history.

(56) References Cited

U.S. PATENT DOCUMENTS

| 5,841,663 | A | 11/1998 | Sharma et al. |
| 6,675,286 | B1 | 1/2004 | Sun et al. |
| 6,745,336 | B1 | 6/2004 | Martonosi et al. |
| 2003/0212727 | A1* | 11/2003 | Macy et al. .................... 708/620 |
| 2004/0168097 | A1 | 8/2004 | Cook et al. |
| 2007/0106914 | A1 | 5/2007 | Muthukumar et al. |
| 2007/0300214 | A1 | 12/2007 | Chang et al. |
| 2008/0294882 | A1 | 11/2008 | Jayapala et al. |

FOREIGN PATENT DOCUMENTS

| EP | 0926596 A2 | 6/1999 |
| EP | 1701249 A1 | 9/2006 |

OTHER PUBLICATIONS

Nakra et al., "Width-Sensitive Scheduling for Resource-Constrained VLIW Processors", Dec. 2001.*
Kraemer et al., "SoftSIMD—Exploiting Subword Parallelism Using Source Code Transformations", 2007.*
Lee, Multimedia Extensions for General-Purpose Processors, 1997, IEEE.*
Kraemer et al, SoftSIMD—Exploiting Subword Parallelism Using Source Code Transformations, 2007.

(Continued)

*Primary Examiner* — Thomas Lee
*Assistant Examiner* — Xuxing Chen
(74) *Attorney, Agent, or Firm* — Knobbe, Martens, Olson & Bear, LLP

(57) ABSTRACT

A method and device for converting first program code into second program code, such that the second program code has an improved execution on a targeted programmable platform, is disclosed. In one aspect, the method includes grouping operations on data for joint execution on a functional unit of the targeted platform, scheduling operations on data in time, and assigning operations to an appropriate functional unit of the targeted platform. Detailed word length information, rather than the typically used approximations like powers of two, may be used in at least one of the grouping, scheduling or assigning operations.

16 Claims, 25 Drawing Sheets

(56) References Cited

OTHER PUBLICATIONS

Nakra et al, Width-Sensitive Scheduling for Resource-Constrained VLIW Processors ACM workshop on feedback directed and dynamic optimization.

Nikolic et al, Design and Implementation of Numerical Linear Algebra Algorithms on Fixed Point DSPs' Research Article, Hindawi Publishing Corporation, EURASIP Journal on Advances in Signal Processing, 2007.

Stephenson et al, Bitwidth Analysis with Application to Silicon Compilation, ACM SIGPLAN 2000 Conference on Programming language design and implementation, Vancouver, 2000.

Zhao et al, Precision Modeling and Bit-width Optimization of Floating-Point Applications, in High Performance Embedded Computing, 2003, 141-142.

Office Action dated Dec. 1, 2011 in U.S. Appl. No. 12/399,831.

Final Office Action dated Oct. 17, 2012 in U.S. Appl. No. 12/399,831.

S.Cosemans, W.Dehaene, F.Catthoor, "A 3.6pJ/Access 480MHz, 128Kbit on-Chip SRAM with 850MHz Boost Mode in 90nm CMOS with Tunable Sense Amplifiers to Cope with Variability", *Proc. 34th Europ. Solid-State Circuits Conf.*, ESSCIRC, Edinburgh, UK, pp. 278-281, Sep. 2008.

R.Evans, P.Franzon, "Energy consumption modeling and optimization for SRAMs", *IEEE J. of Solid-state Circ.*, vol. SC-30, No. 5, pp. 571-579, May 1995.

P.Geens, "Active supply control in static random-access memories", *Doctoral dissertation*, ESAT/EE Dept., K.U.Leuven, Belgium, Apr. 2009.

A.Kritikakou, "Low-cost low-energy embedded processors for on-line biotechnology monitoring applications", Master's Thesis, U.Patras-IMEC, Feb. 2009.

G.Lafruit, F.Catthoor, J.Cornelis, H.De Man, "An efficient VLSI architecture for the 2-D wavelet transform with novel image scan", *IEEE Trans. on VLSI Systems*, vol. 7, No. 1, pp. 56-68, Mar. 1999.

A.Lambrechts, T.Van der Aa, M.Jayapala, G.Talavera, A.Leroy, A.Shickova, F.Barat, B.Mei, F.Catthoor, D.Verkest, G.Deconinck, H.Corporaal, F.Robert, J.Carrabina Bordoll, "Design Style Case Study for Embedded Multi Media Compute Nodes", *IEEE Proc. 25th Intnl. Symp. on Real Time Systems (RTSS)*, Lisbon, Portugal, pp. 104-113, Dec. 2004.

A.Lambrechts, P.Raghavan, D.Novo Bruno, E.Rey Ramos, M.Jayapala, J.Absar, F.Catthoor, D.Verkest, "Enabling word-width aware energy optimizations for embedded processors", *Proc. Intnl. Wsh. on Optimisations for DSP and Embedded Systems (ODES)*, San Jose CA, pp. 66-75, Mar. 2007.

P.Raghavan, A.Lambrechts, M.Jayapala, F.Catthoor, D.Verkest, "Distributed loop controller architecture for multi-threading in uni-threaded VLIW Processors", *Proc. 9th ACM/IEEE Design and Test in Europe Conf. (DATE)*, Munich, Germany, pp. 339-344, Mar. 2006.

P.Raghavan, S.Munaga, E.Rey Ramos, A.Lambrechts, M.Jayapala, F.Catthoor, D.Verkest, "A Customized Cross-bar for Data-shuffling in Domain-specific SIMD Processors", *Proc. Intnl. Wsh. on Architecture of Computing Systems (ARCS)*, Zurich, Switzerland, pp. 57-68, Mar. 2007.

P.Raghavan, A.Lambrechts, M.Jayapala, F.Catthoor, D.Verkest, H.Corporaal, "Very wide register: an asymmetric register file organisation for low power embedded processors", *Proc. 10th ACM/IEEE Design and Test in Europe Conf.(DATE)*, Nice, France, pp. 1066-1071, Apr. 2007.

P.Raghavan, N.Sethubalasubramanian, S.Munaga, E.Rey Ramos, M.Jayapala, D.Weiss, F.Catthoor, D.Verkest, "Semi Custom Design: A Case Study on SIMD Shufflers", *Proc. IEEE Wsh. on Power and Timing Modeling, Optimization and Simulation (PATMOS)*, Lecture Notes in Computer Science vol. 4644, Goteborg, Sweden, pp. 433-442, Sep. 2007.

H.Wang, M.Miranda, A.Papanikolaou, F.Catthoor, "Systematic Analysis of Energy and Delay Impact of Very Deep Submicron Process Variability Effects in Embedded SRAM Modules", *Proceedings of the Design, Automation and Test in Europe Conference and Exhibition (DATE)*, Munich, Germany, pp. 914-919, Mar. 2005.

T. Leroy, E. Vranken, A. Van Brecht, E. Struelens, B. Sonck, and D. Berckmans, "A computer vision method for on-line behavioral quantification of individually caged poultry," Transactions of the ASAE, vol. 49, pp. 795-802, 2006.

David Novo, Bruno Bougard, Andy Lambrechts, Liesbet van der Perre, and Francky Cattoor, "Scenario-based fixed-point data format refinement to enable energy-scalable software defined radios," in Design and Test in Europe Conf. (DATE), 2008: Proceedings of the conference on Design, automation and test in Europe. 2008, IEEE Press.

K. D. Cooper, L. T. Simpson, and C. A. Vick, "Operator strength reduction," ACM Trans. Program. Lang. Syst., vol. 23, No. 5, pp. 603-625, 2001.

J. E. Volder, "The CORDIC Trigonometric Computing Technique," IRE Trans. Electronic Computing, vol. EC-8, pp. 330-334, Sep. 1959.

G.W. Reitwiesner, "Binary arithmetic," Advances in computers, vol. 1, No. 231-308, pp. 72, 1960.

Texas Instruments, Inc., http://csrl.unt.edu/svn/repos/palmerc/dsp/doc/spru732c.pdf, TMS320C64x/C64x+ DSP CPU and Instruction Set Reference Guide (Rev. C). SPRU732J—Jul. 2010.

BDTI, http://www.insidedsp.com/tabid/64/articleType/ArticleView/articleId/173/Implementing-SIMD-in-Software.aspx, Implementing SIMD in Software, Jun. 2006.

P. Raghavan, M. Jayapala, A. Lambrechts, J. Absar, and F. Catthoor, "Playing the trade-off game: Architecture exploration using coffee," ACM Transactions on Design Automation of Embedded Systems (TODAES) 14(3), 2009.

L.N. Chakrapani, J. Gyllenhaal,W.W. Hwu, S.A.Mahlke, K.V. Palem, and R.M. Rabbah, "Trimaran: An infrastructure for research in instruction-level parallelism," Lecture Notes in Computer Science, vol. 3602, pp. 32-41, 2005.

R. S. Bajwa, M. Hiraki, H. Kojima, D. J. Gorny, K. Nitta, A. Shridhar, K. Seki, and K. Sasaki, "Instruction buffering to reduce power in processors for signal processing," IEEE Transactions on VLSI Systems, vol. 5, No. 4, pp. 417-424, Dec. 1997.

P. Raghavan, A. Lambrechts, M. Jayapala, F. Catthoor, and D. Verkest, "Distributed loop controller for multi-threading in uni-threaded ilp architectures," IEEE Transactions on Computers, vol. 58, No. 3, pp. 311-321, Mar. 2009.

Jaypala, et. al., "Clustered Loop Buffer Organization for Low Energy VLIW Embedded Processors", IEEE Transactions on VLSI, Jun. 2004.

Banerjia, et. al., "Instruction fetch mechanisms for VLIW architectures with compressed encodings.", Proc of 29th International Symposium on Microarchitecture (MICRO), Dec. 1996.

Estela Rey Ramos. Low Power Shufflers. IMEC, Internal Technical Report, No. LTR-APHD-TR-16, Dec. 2006.

Francky Catthoor, Back- and foreground memory organisation for energy-efficient data parallel access, Feb. 2009.

European Search Report for European Patent Application No. 10174072.8—1243 dated May 25, 2011 by European Patent Office.

\* cited by examiner

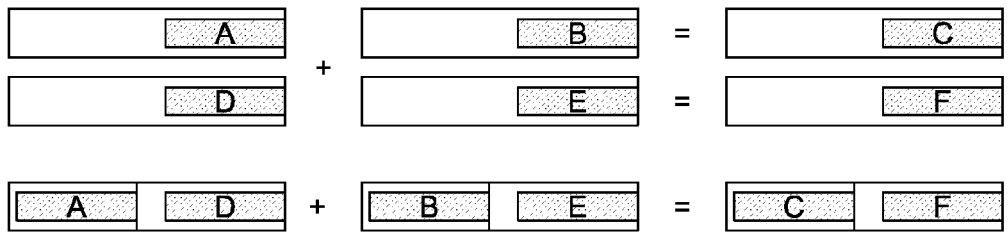
FIG. 1 - prior art
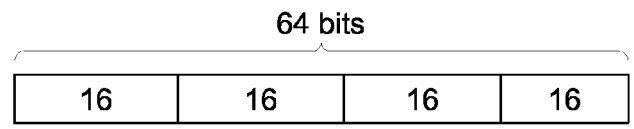
FIG. 2 - prior art
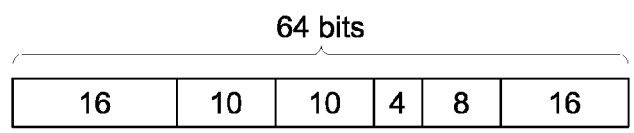
FIG. 3 - prior art
FIG. 4A
FIG. 4B

| | | 12 | 11 | 10 | 9 | 8 | 7 | 6 | 5 | 4 | 3 | 2 | 1 | 0 | | | | |
|---|---|---|---|---|---|---|---|---|---|---|---|---|---|---|---|---|---|---|
| | > | x | x | x | x | x | x | x | . | | | | | | | | | |
| - | < | | | | | x | x | x | x | x | x | x | . | | | | | |
| | > | x | x | x | x | x | x | x | x | x | x | x | . | | | | | |
| | > | | | | x | x | x | x | x | x | x | x | x | x | x | . | | |
| + | > | x | x | x | x | x | x | x | x | x | x | x | x | x | . | | | |
| | > | | | x | x | x | x | x | x | x | x | x | x | x | x | x | . | |
| + | | x | x | x | x | x | x | x | x | x | x | x | x | x | x | . | | |
FIG. 12
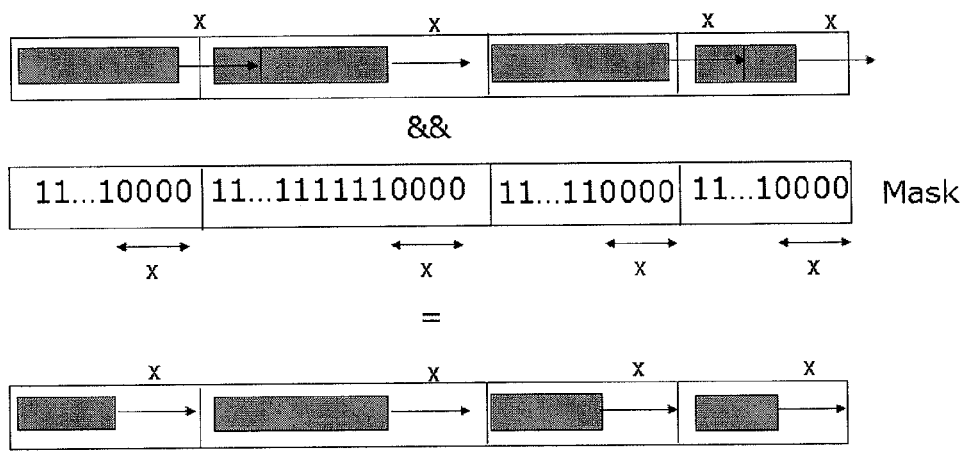
FIG. 13
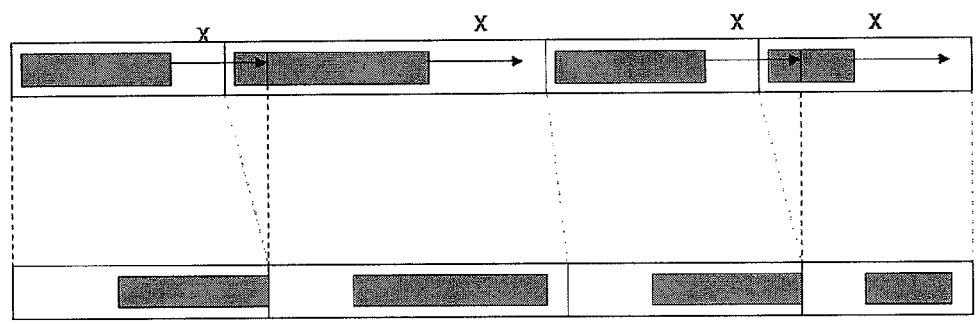
FIG. 14

| | s_0_0_0 | s_1_0_0 |
|---|---|---|
| 1 | ADD_W | |
| 2 | ADD_W | L_W_C1_C1 |
| 3 | ADD_W | L_W_C1_C1 |
| 4 | ADD_W | L_W_C1_C1 |
| 5 | ADD_W | L_W_C1_C1 |
| 6 | ADD_W | L_W_C1_C1 |
| 7 | GSA1 | L_W_C1_C1 |
| 8 | GSA1 | REPACK |
| 9 | GSA1 | REPACK |
| 10 | GSA1 | REPACK |
| 11 | GSA1 | REPACK |
| 12 | GSA1 | REPACK |
| 13 | GSA1 | REPACK |
| 14 | GSA1 | REPACK |
| 15 | GSA1 | REPACK |
| 16 | GSA1 | REPACK |
| 17 | GSA1 | REPACK |
| 18 | GSA1 | REPACK |
| 19 | GSA1 | REPACK |
| 20 | GSA1 | REPACK |
| 21 | GSA1 | REPACK |
| 22 | GSA1 | REPACK |
| 23 | GSA1 | REPACK |
| 24 | ADD_W | REPACK |
| 25 | GSA1 | REPACK |
| 26 | GSA1 | REPACK |
| 27 | GSA1 | REPACK |
| 28 | GSA1 | REPACK |
| 29 | ADD_W | REPACK |
| 30 | GSA1 | REPACK |
| 31 | GSA1 | REPACK |
| 32 | ADDL_W | REPACK |
| 33 | ADD_W | REPACK |
| 34 | GSA1 | REPACK |
| 35 | GSA1 | REPACK |
| 36 | GSA1 | S_W_C1 |
| 37 | ADD_W | S_W_C1 |
| 38 | BRF_B_B_F | S_W_C1 |

*FIG. 25*

|   | s_0_0_0 | s_1_0_0 |
|---|---------|---------|
| 1 | ADD_W   |         |
| 2 | ADD_W   | L_W_C1_C1 |
| 3 | ADD_W   | L_W_C1_C1 |
| 4 | GSA1    | L_W_C1_C1 |
| 5 | ADDL_W  |         |
| 6 | GSA1    |         |
| 7 | GSA1    |         |
| 8 | ADD_W   | S_W_C1  |
| 9 | BRF_B_B_F |       |
*FIG. 25 Continued*
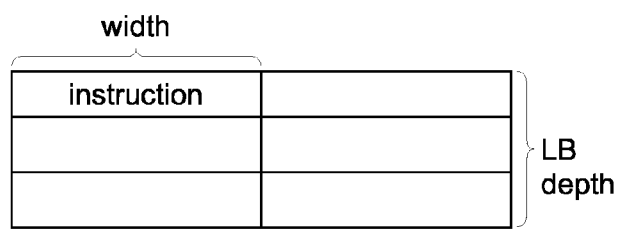
*FIG. 28*
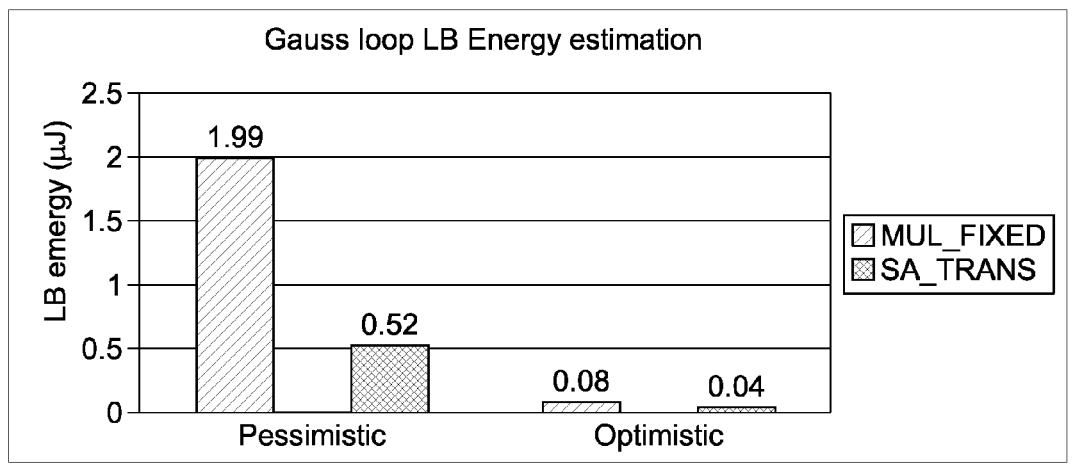
*FIG. 29*

| | s_0_0_0 | | s_1_0_0 | |
|---|---|---|---|---|
| 1 | ADD_W | Address: (x-1,y-1) | ADD_W | Address: (x-1,y) |
| 2 | L_W_C1_C1 | Load pixel: (x-1,y-1) | L_W_C1_C1 | Load pixel: (x-1,y) |
| 3 | ADD_W | Address: (x-1,y+1) | ADD_W | Address: (x,y-1) |
| 4 | L_W_C1_C1 | Load pixel: (x-1,y+1) | L_W_C1_C1 | Load pixel: (x,y-1) |
| 5 | MPYL_W | (x-1,y-1)*Gauss(0,0) | ADD_W | Address: (x,y) |
| 6 | MPYL_W | (x-1,y)*Gauss(0,1) | L_W_C1_C1 | Load pixel: (x,y) |
| 7 | MPYL_W | (x-1,y+1)*Gauss(0,2) | ADD_W | Address: (x,y+1) |
| 8 | MPYL_W | (x,y-1)*Gauss(1,0) | L_W_C1_C1 | Load pixel: (x,y+1) |
| 9 | ADD_W | Address: (x+1,y-1) | SHL_W | Outputof Mul S5 << Dec |
| 10 | MPYL_W | (x,y)*Gauss(1,1) | SHL_W | Outputof Mul S6 << Dec |
| 11 | L_W_C1_C1 | Load pixel: (x+1,y-1) | ADD_W | Address: (x+1,y) |
| 12 | MPYL_W | (x,y+1)*Gauss(1,2) | SHL_W | Outputof Mul S7 << Dec |
| 13 | L_W_C1_C1 | Load pixel: (x+1,y) | ADD_W | Address: (x+1,y+1) |
| 14 | ADDL_W | | SHL_W | Outputof Mul S8 << Dec |
| 15 | MPYL_W | (x+1,y-1)*Gauss(2,0) | L_W_C1_C1 | Load pixel: (x+1,y+1) |
| 16 | ADDL_W | | SHL_W | Outputof Mul S10 << Dec |
| 17 | MPYL_W | (x+1,y)*Gauss(2,1) | ADDL_W | |
| 18 | MPYL_W | (x+1,y+1)*Gauss(2,2) | SHL_W | Outputof Mul S12 << Dec |
| 19 | ADDL_W | | SHL_W | Outputof Mul S15 << Dec |
| 20 | ADDL_W | | SHL_W | Outputof Mul S17 << Dec |
| 21 | ADDL_W | | SHL_W | Outputof Mul S8 << Dec |
| 22 | ADDL_W | | ADDL_W | |
| 23 | ADDL_W | | ADDL_W | y++ |
| 24 | ADD_W | | SHR_W | ImGauss(x,y)>>DecImGauss |
| 25 | BRF_B_B_F | | S_W_C1 | Store pixel: ImGauss (x,y) |

*FIG. 26*

|   | s_0_0_0 | s_1_0_0 |
|---|---------|---------|
| 1 | ADD_W | |
| 2 | ADD_W | L_W_C1_C1 |
| 3 | ADD_W | L_W_C1_C1 |
| 4 | ADD_W | L_W_C1_C1 |
| 5 | ADD_W | L_W_C1_C1 |
| 6 | ADD_W | L_W_C1_C1 |
| 7 | GSA1 | L_W_C1_C1 |
| 8 | GSA1 | REPACK |
| 9 | GSA1 | REPACK |
| 10 | GSA1 | REPACK |
| 11 | GSA1 | REPACK |
| 12 | GSA1 | REPACK |
| 13 | GSA1 | REPACK |
| 14 | GSA1 | REPACK |
| 15 | GSA1 | REPACK |
| 16 | GSA1 | REPACK |
| 17 | GSA1 | REPACK |
| 18 | GSA1 | REPACK |
| 19 | GSA1 | REPACK |
| 20 | GSA1 | REPACK |
| 21 | GSA1 | REPACK |
| 22 | GSA1 | REPACK |
| 23 | GSA1 | REPACK |
| 24 | ADD_W | REPACK |
| 25 | GSA1 | REPACK |
| 26 | GSA1 | REPACK |
| 27 | GSA1 | REPACK |
| 28 | GSA1 | REPACK |
| 29 | ADD_W | REPACK |
| 30 | GSA1 | REPACK |
| 31 | GSA1 | REPACK |
| 32 | ADDL_W | REPACK |
| 33 | ADD_W | REPACK |
| 34 | GSA1 | REPACK |
| 35 | GSA1 | REPACK |
| 36 | GSA1 | S_W_C1 |
| 37 | ADD_W | S_W_C1 |
| 38 | BRF_B_B_F | S_W_C1 |

*FIG. 30*

|   | s_0_0_0 | s_1_0_0 |
|---|---------|---------|
| 1 | ADD_W   |         |
| 2 | ADD_W   | L_W_CI_CI |
| 3 | ADD_W   | L_W_CI_CI |
| 4 | GSA1    | L_W_CI_CI |
| 5 | ADDL_W  |         |
| 6 | GSA1    |         |
| 7 | GSA1    |         |
| 8 | ADD_W   | S_W_CI  |
| 9 | BRF_B_B_F |       |

Gauss loop

Multiplier FU

|    | s_0_0_0   | s_1_0_0   |
|----|-----------|-----------|
| 1  | ADD_W     | ADD_W     |
| 2  | L_W_C1_C1 | L_W_C1_C1 |
| 3  | ADD_W     | ADD_W     |
| 4  | L_W_C1_C1 | L_W_C1_C1 |
| 5  | MPYL_W    | ADD_W     |
| 6  | MPYL_W    | L_W_C1_C1 |
| 7  | MPYL_W    | ADD_W     |
| 8  | MPYL_W    | L_W_C1_C1 |
| 9  | ADD_W     | SHL_W     |
| 10 | MPYL_W    | SHL_W     |
| 11 | L_W_C1_C1 | ADD_W     |
| 12 | MPYL_W    | SHL_W     |
| 13 | L_W_C1_C1 | ADD_W     |
| 14 | ADDL_W    | SHL_W     |
| 15 | MPYL_W    | L_W_C1_C1 |
| 16 | ADDL_W    | SHL_W     |
| 17 | MPYL_W    | ADDL_W    |
| 18 | MPYL_W    | SHL_W     |
| 19 | ADDL_W    | SHL_W     |
| 20 | ADDL_W    | SHL_W     |
| 21 | ADDL_W    | SHL_W     |
| 22 | ADDL_W    | ADDL_W    |
| 23 | ADDL_W    | ADDL_W    |
| 24 | ADD_W     | SHR_W     |
| 25 | BRF_B_B_F | S_W_C1    |

FIG. 33

GSAS FU

|    | s_0_0_0            | s_1_0_0   |
|----|--------------------|-----------|
| 1  | ADD_W              | ADD_W     |
| 2  | ADD_W              | L_W_C1_C1 |
| 3  | ADD_W              | L_W_C1_C1 |
| 4  | ADD_W              | L_W_C1_C1 |
| 5  | GSAS1              | L_W_C1_C1 |
| 6  | GSAS3              | GSAS3     |
| 7  |                    |           |
| 8  |                    |           |
| 9  | GSAS1              | L_W_C1_C1 |
| 10 | GSAS1              | S_W_C1    |
| 11 | GSAS1              | ADDL_W    |
| 12 | GSAS1              | ADD_W     |
| 13 | ADD_W              | S_W_C1    |
| 14 | BRF_B_B_F          |           |

Subtract background

Multiplier FU

|    | s_0_0_0          | s_1_0_0   |
|----|------------------|-----------|
| 1  | ADD_W            | ADD_W     |
| 2  | L_W_C1_C1        | L_W_C1_C1 |
| 3  | ADD_W            | PBRR      |
| 4  |                  | SHR_W     |
| 5  | S_W_C1           | L_W_C1_C1 |
| 6  |                  | SHR_W     |
| 7  | S_W_C1           | SHL_W     |
| 8  | SUBL_W           |           |
| 9  | S_W_C1           | L_W_C1_C1 |
| 10 |                  |           |
| 11 | CMPP_W_LGT_UN_UN |           |
| 12 | BRCT             |           |

*FIG. 33 Continued (1)*

GSAS FU

|   | s_0_0_0 | s_1_0_0 |
|---|---|---|
| 1 | ADD_W | ADD_W |
| 2 | PBRR | L_W_C1_C1 |
| 3 |  | L_W_C1_C1 |
| 4 |  |  |
| 5 | GSAS1 |  |
| 6 | CMPP_W_LGT_UN_UN | S_W_C1 |
| 7 | BRCT |  | image moments

Multiplier FU

|   | s_0_0_0 | s_1_0_0 |
|---|---|---|
| 1 | ADD_W | ADDL_W |
| 2 | MPYL_W | L_W_C1_C1 |
| 3 | ADDL_W | ADDL_W |
| 4 | MPYL_W | ADDL_W |
| 5 | MPYL_W | ADDL_W |
| 6 | MPYL_W | ADD_W |
| 7 | MPYL_W | ADDL_W |
| 8 | MPYL_W | ADDL_W |
| 9 | BRF_B_B_F | ADDL_W |

GSAS FU

|   | s_0_0_0 | s_1_0_0 |
|---|---|---|
| 1 | ADD_W | ADD_W |
| 2 | PBRR | L_W_C1_C1 |
| 3 | ADD_W | L_W_C1_C1 |
| 4 | ADD_W | L_W_C1_C1 |
| 5 | GSAS1 | L_W_C1_C1 |
| 6 | GSAS1 | GSAS1 |
| 7 | GSAS1 | GSAS1 |
| 8 | GSAS1 |  |
| 9 | BRU |  |

*FIG. 33 Continued (2)*

Conversion to binary

Multiplier FU

| | s_0_0_0 | s_1_0_0 |
|---|---|---|
| 1 | ADD_W | PBRR |
| 2 | L_W_CI_CI | S_W_CI |
| 3 | | |
| 4 | CMPP_W_LGT_UN_UN | |
| 5 | BRCT | |

GSAS FU

| | s_0_0_0 | s_1_0_0 |
|---|---|---|
| 1 | ADD_W | |
| 2 | PBRR | L_W_CI_CI |
| 3 | | |
| 4 | CMPP_W_LGT_UN_UN | |
| 5 | BRCT | |

FIG. 33 Continued (3)

METHOD AND SYSTEM FOR IMPROVING PERFORMANCE AND REDUCING ENERGY CONSUMPTION BY CONVERTING A FIRST PROGRAM CODE INTO A SECOND PROGRAM CODE AND IMPLEMENTING SIMD

CROSS REFERENCE TO RELATED APPLICATIONS

This application claims priority under 35 U.S.C. §119(e) to U.S. provisional patent application 61/238,389 filed on Aug. 31, 2009, which application is hereby incorporated by reference in its entirety.

BACKGROUND OF THE INVENTION

1. Field of the Invention

The present invention relates to ultra-low power (ULP) embedded systems, and to application specific instruction set processors (ASIPs) therefore. More particularly, the present invention relates to methods and devices for reducing power consumption in such ASIPs.

2. Description of the Related Technology

Low power implementation is a key element in embedded system design. The low power nature can be used in various domains, for example ranging from biomedical domain to consumer electronics. ASIP or Application Specific Instruction set Processors are used instead of general purpose processors to reduce the power consumption. These ASIP architectures have to be customized to reduce the power consumption.

In applications that exhibit a high degree of data-level parallelism, such as multimedia or wireless communications, single instruction multiple data (SIMD) technique is used to greatly reduce application execution time and energy consumption, thus increasing the performance of applications. In SIMD, multiple data (sub-words) are packed together and operated on as a single word, as illustrated in FIG. 1. The SIMD exploits the data parallelism that is contained in applications, for example in multimedia. Thereby, the cost in energy and time associated with the SIMD operation (operand load, execution, result storage) is shared by all the sub-words. Depending on the platform support, hardware SIMD (Hard-SIMD) and software SIMD (Soft-SIMD) are possible. By applying SIMD, Soft or Hard, the increase in parallelism leads to reduction in the number of operations performed on the data and of accesses to the instruction memory. As fewer operations have to be scheduled, performance can be improved.

Hardware SIMD (Hard-SIMD) is currently used by commercial energy efficient high performance processors, which provide special hardware in their data path that supports combinations of sub-words of the same length (e.g. a TIC64 of Texas Instruments supports 1×32 bit, 2×16 bit or 4×8 bit sub-word). However, the limited number of different sub-words (typically power-of-two) sets the ceiling of the data to the next available (power-of-2) hardware sub-word. This leads to unused bits and therefore a loss in efficiency. Moreover, different Hard-SIMD implementations are incompatible with each other, due to the fact that each implementation provides a number of SIMD and a set of pack and unpack instructions based on the target architecture, leading to low portability of the application. As an example, Hardware SIMD with 16 bits sub-words is illustrated in FIG. 2.

Software SIMD (Soft-SIMD) is independent of the target architecture providing portability of the application. It does not require operators with specific hardware support and as a result of this, additional instructions must be inserted in order to guarantee the functional correctness. To guarantee that sub-words remain independent is now a designer's task. This can be done, e.g. by inserting guards bits between sub-words which avoid bit rippling across sub-words. Such an approach enables high flexibility in the sub-word configuration. This enables sub-words of arbitrary length to be operated together as a single word. Soft-SIMD with different sub-words is illustrated in FIG. 3.

The Soft-SIMD speed up in performance is lower than for the Hard-SIMD, but due to the flexibility of the sub-words it can explore the bit-width (word-length) information by making more efficient combinations. The Soft-SIMD can improve the performance, the energy efficiency and the flexibility. However, care must be taken in order not to lose the obtained gain due to the insertion of the extra operations for correction, such as packing and masking operations. Soft-SIMD is able of packing different sub-words leading to more efficient parallelization and also enables the usage of SIMD in applications that cannot benefit from Hard-SIMD, e.g. the applications where the minimum sub-word is larger than the supported sub-words in hardware.

Soft-SIMD suffers from two major drawbacks. Firstly, only positive numbers can be operated. Guard bits need to be equal for all the sub-words, but due to the nature of 2's complement representation, 0's are required as guard bits for positive numbers and 1's for negative ones. This can be easily solved by adding an offset to the computed data. The latter should be adapted at different parts of the processing in order to maintain the positive sign while optimally utilizing the available bit-widths. The second drawback comes from the fact that multiplications require a prohibitive amount of guard bits. This seriously reduces efficiency and thus the application scope of the technique. The need for many guard bits is related to the bit-width growth experienced in a multiplication, as explained below.

Multiplications are 'expensive' operations with a high execution duty cycle and thus its optimization has a big impact on the overall implementation cost. It is generally known that a constant multiplication can be converted into a shift-add operation. A multiplication of a variable by a constant can be factorized into a fixed sequence of shifts and add/subtracts. The number of shifts and add/subtracts required directly depends on the number of non-zero bits comprised in the constant. As an example, the multiplication of a variable a by the constant 138 is considered (3 non-zero bits: 10001010). This constant multiplication is equivalent to the following:

$$b = a \cdot 138 = (a<<7) + (a<<3) + (a<<1) \qquad \text{(Eq. 1)},$$

where the constant multiplication is replaced with one shift per non-zero bit (shift by 7, 3 and 1) and the addition of the shifted results. Clearly, constants with minimum non-zero bits are preferred as they lead to a cheaper implementation. Accordingly, constants are coded in a CSD (Canonic Signed Digit) form. CSD representation contains the minimum possible number of non-zero bits, which consists of, on average, 33% fewer non-zero bits than two's complement number.

Despite Constant Multiplication to Shift-Add/subtract (CM2SA) conversion is extensively exploited in VLSI (Very Large Scale Integration) synthesis, its application in compilers is rather limited. The systematic application of strength reduction techniques could even lead to a less efficient implementation depending on the processor architecture. Thus, very conservative assumptions are normally considered for e.g. only CM2SA for constants that are a power of 2. However, in an ASIP implementation, the processor architecture is not fixed, and processor's data path can be designed to effectively support shift-add/subtract operations.

The CM2SA example given above is based on leftshift operations, which emulates the data flow of a typical multiplier. However, this suffers from a severe drawback when fixed-point data of multiple bit-widths is operated. Namely, output data bit-width grows only depending on the input (e.g. in an unsigned multiplier: outbit=in1bit+in2bit). In case the precision required in the result is lower, the bit-width can only be reduced at the output of the operation with a right-shift. To illustrate the principle the same example is considered, but now taking into account bit-width information: the variable a requires 7 bits, 138 requires 8 bits and the solution b requires 9 bits, respectively. FIG. 4(a) shows how this is operated on a CM2SA based on left-shift according to equation (Eq. 1) above. A variable a of all '1s' (127) is considered as the worst case for dynamic range growth. The result b results from adding three shifted values of a. As only the higher 9 bit of the output are relevant, the result b is truncated by right-shifting 6 positions. However, the operator needs to be dimensioned for 15 bit output in order to avoid over-flow. Given that only 9 bits are required, this incurs in undesired overhead.

There is room for improved methods and devices for reducing power consumption in embedded systems.

SUMMARY OF CERTAIN INVENTIVE ASPECTS

Certain inventive aspects relate to a low-cost low-energy implementation of applications performed on an embedded system.

In one aspect, the application handled by an embedded system may be converted to fixed-point arithmetic. The dynamic range analysis and the precision analysis lead to different and widely varying variable word-lengths for the signals used by the application. The estimated word-lengths may be used for the transformation to a fixed point representation of the application, leading to a reduction of the required data path width of the application's operands. In a Soft-SIMD version where different signals are concatenated in a very wide data-path, this leads to even larger savings.

The need for a low-cost and low-energy implementation leads to the reduction of the most costly operations, namely the multiplications, through a conversion to sequences of shift and add operations. In embodiments of the present invention, use is made of a right shift sequential approach. This has the advantage that both the required shift factors and the data path width are smaller than with other approaches. Moreover, a reduction in the number of multiplication operations and shift and addition operations per multiplication operation may be achieved by careful constant quantization combined with several program code transformations to reduce the energy consumption.

In another aspect, an ASIP architecture is provided, which can integrate a constant multiplication loop of the application to be handled by the embedded system. In accordance with embodiments of the present invention different Functional Units (FUs) are provided and connection structures that implement the sequences of shift and add operations. Furthermore, packing different variables with small word-lengths into one packed word may enable the data parallelization of the application. Data parallelization using Soft-SIMD techniques may involve very advanced scheduling and shuffling optimizations. This may allow to significantly reduce the overhead that is normally involved in the instruction and data memory hierarchy. The data memory organization may be heavily reduced in energy impact by the exploitation of very wide registers and ultra-low power SRAM access schemes.

In one aspect, the present invention provides a compile or pre-compile method for converting first program code into second program code, such that the second program code has an improved execution on a targeted programmable platform. The method according to embodiments of the present invention comprises a) grouping operations on data for joint execution on a functional unit of the targeted platform, b) scheduling operations on data in time, and c) assigning operations to an appropriate functional unit of the targeted platform, wherein detailed word length information is used in at least one of the grouping, scheduling or assigning operations, rather than the typically used approximations like powers of two.

In a compile or pre-compile method according to embodiments of the present invention, scheduling and assigning operations may comprise scheduling and assigning at least one multiplication operation such that it is converted into at least one of add/subtract and/or shift operations or combinations thereof. In particular embodiments, scheduling and assigning at least one multiplication operation may include converting it into operations including a right shift operation. This is advantageous as the required shift factors and data path width may be reduced.

A compile or pre-compile method according to embodiments of the present invention may furthermore comprise packing different variables with small word lengths into one packed word.

A compile or pre-compile method according to embodiments of the present invention may implement Soft-SIMD instructions by adding guard data to the data such that joint operation on the data is not jeopardizing the correctness of the data.

A compile or pre-compile method according to embodiments of the present invention may furthermore comprise, for the conversion of first program code into second program code, clustering of different run-time scenarios into a smaller set of different scenarios. This clustering may depend on, or take into account word length information.

A compile or pre-compile method according to embodiments of the present invention may furthermore comprise reconfiguring the targeted programmable platform with a configuration parameter determined during design time, the selection of a particular configuration parameter being determined depending on the required detailed word length information.

In a further aspect, the present invention provides a system for converting on a computer environment a first program code into a second program code, the program codes representing an application, such that the second program code has an improved performance and/or lower energy consumption on a targeted programmable platform than the first program code. The system comprises a) a loading module for loading on the computer environment the first program code and for at least part of the variables within the program code the word length required to have the precision and overflow behavior as demanded by the application, and b) a converting module for converting the first program code into the second program code by grouping operations of the same type of variables for joint execution on a functional unit of the targeted programmable platform, the grouping operations using the required word length, the functional unit supporting one or more word lengths, the grouping operation being selected to use at least partially one of the supported word lengths.

A system according to embodiments of the present invention may further comprise hardware adapted for reconfiguring the targeted programmable platform, the reconfiguring being based on required detailed word length information.

A system according to embodiments of the present invention may further comprise a scheduler for scheduling and assigning, prior to carrying out of the grouping operations, at least one multiplication operation such that it is converted into at least one of add/subtract and/or shift operations or combinations thereof. The scheduler may be adapted for scheduling and assigning at least one multiplication operation such that the shift operation is a right shift operation. This way, the required shift factors and data path width may be reduced.

A system according to embodiments of the present invention may furthermore comprise hardware for enabling avoidance of sub-word overlapping. Such hardware may comprise insertion means for insertion of variant checking points into the program code, that are able to remove shifted bits when they are going to pass to another sub-word.

A system according to embodiments of the present invention may furthermore comprise a shuffle functional unit for discarding bits that are going to overlap with nearby sub-words.

A system according to embodiments of the present invention may furthermore comprise at least one decoder for decoding instructions between loop buffers. The at least one decoder may be adapted for translating at least a part of the instructions stored in one loop buffer into another set of instructions in a second loop buffer.

A system according to embodiments of the present invention may furthermore comprise a controller, e.g. a hardware or a software controller, for sensing external conditions identifying a current scenario, and selecting an implementation from a clustered set of scenarios.

Particular and preferred aspects of the invention are set out in the accompanying independent and dependent claims. Features from the dependent claims may be combined with features of the independent claims and with features of other dependent claims as appropriate and not merely as explicitly set out in the claims.

Some advantages of certain inventive aspects have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 1 illustrates application of SIMD: instead of having one operand for one data with small word length, different data are combined into one packed word.

FIG. 2 illustrates hardware SIMD with 16 bits sub-words.

FIG. 3 illustrates software SIMD with different sub-words.

FIG. 4 illustrates "a.138" factorized with two strength reduction techniques: (a) according to the prior art, and (b) according to an embodiment of the present invention.

FIG. 12 illustrates performed shift operations due to multiplication with constant $655_{dec}$.

FIG. 13 illustrates breakdown per component of the energy consumption of the Gauss filter in the different architectures as illustrated in FIG. 7 and FIG. 9.

FIG. 14 illustrates repack and shift operation for functional correctness in Soft-SIMD.

FIG. 18 illustrates addition of 8-bit sub-words.

FIG. 19 illustrates a sequence of shift and addition operations due to multiplication by constant $655_{dec}$ to 12-bit sub-words.

FIG. 20 illustrates a sequence of shift and addition operations due to multiplication by constant $983_{dec}$ to 12-bit sub-words.

FIG. 21 illustrates addition to 12-bit sub-words.

FIG. 22 illustrates shift operations and additions performed on the y-vector on 13-bit sub-words.

FIG. 25 illustrates software scheduling for the parallel multiplication loop using Soft-SIMD on x and on y in accordance with embodiments of the present invention.

FIG. 28 illustrates a loop buffer structure.

FIG. 29 illustrates a LB comparison for pessimistic and optimistic approach of an original multiplication loop implemented to multiplier FU and transformed multiplication loop implemented to SA FU.

FIG. 33 illustrates software scheduling of dominant loops.

Figures 5, 6:
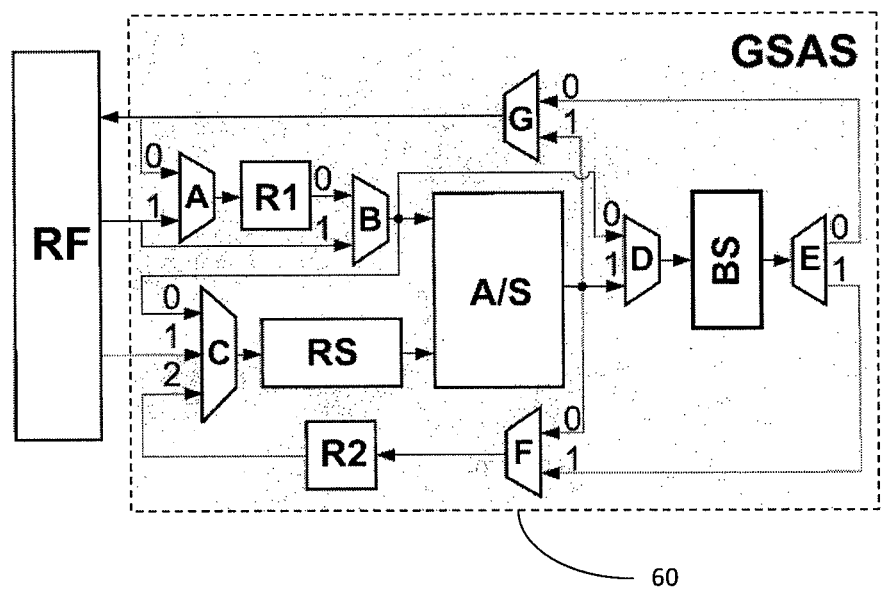
FIG. 5 illustrates a soft-SIMD implementation of "a.138" in 2 10-bit sub-words.
FIG. 6 illustrates a generic shift-add/subtract-shift (GSAS) operator according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF CERTAIN ILLUSTRATIVE EMBODIMENTS

In accordance with embodiments of the present invention, mapping techniques are proposed for mapping software onto an ASIP architecture. The mapping techniques according to embodiments of the present invention consider the bit-width information to enhance the utilization of the ASIP architecture.

According to embodiments of the present invention, a novel shift add/subtract operation is provided. The new CM2SA technique according to embodiments of the present invention is illustrated in FIG. 4 (b), which shows how this is operated according to equation (Eq. 2).

$$b = a \cdot 138 \quad \text{(Eq. 2)}$$
$$= (a<<7) + (a<<3) + (a<<1) >> 6$$
$$= (a<<1) + (((a<<1) + (a>>1)) >> 4)$$
$$= \alpha + ((\alpha + (\alpha >> 2)) >> 4),$$

The novel shift add/subtract operation first searches for a common factor which can be repeated, and which is such that the number of shifts to be applied is optimized, for example minimized. In the example illustrated, the novel shift add/subtract operation first left-shifts a so that MSBa=MSBb−1, where MSB stands for Most Significant Bit. In the current example, this alignment implies a left-shift by 1 (see statement 1). This intermediate result, the common factor α, is re-used throughout the rest of the computation: a·138=α+((α+(α>>2))>>4). So statement 5 in FIG. 4(b) adds a (statement 3) with the result of statement 4 and statement 7 is the result of a summation of statement 3 and statement 6. As a result, the operator needs to be dimensioned just for the 9 bit output, since truncation is now performed in the intermediate left-shifts.

In most DSP (Digital Signal Processing) applications, some quantization error can be accommodated without impacting final performance. Thus, the output bit-width of an operation does not need to be the worst case propagation of the input bit-widths. In these cases, a CM2SA based on the technique according to embodiments of the present invention allows operators with smaller bit-widths than other strength reduction techniques. This allows to save area, energy and delay.

The above strength reduction technique according to embodiments of the present invention for constant multiplication may be introduced when using soft-SIMD for solving the problem of the need for many guard bits, which is related to the bit-width growth experienced in a multiplication.

However, still, the overlapping between sub-words caused by the right-shift operations according to embodiments of the present invention needs to be avoided.

The right-shifted bits that are truncated in the non-vectorized case, now become the MSBs of the sub-word placed on the right. So an effective alternative is proposed. FIG. 5 shows a soft-SIMD version on 2 sub-words of the constant multiplication of FIG. 4(b). An extra guard bit needs to be inserted between sub-words (dark gray in the figure). This guard bit makes sure that sub-words do not interfere with each other. The principle can be seen in statement 4 where a bit of sub-word 1 enters into the guard bit region of sub-word 0. Then, statement 5 adds the results of statement 3 and 4. The addition increases the bit-width of the sub-words, but due to the inserted guard bit, this does not ripple across sub-words. Statement 6 consists of a shuffle operation which sets the guard bits to 0 and also the bits from sub-word 1 that are going to be shifted to sub-word 0 in statement 7 (these bits are indicated in bold). This last action prevents the bit rippling across sub-words in statement 8, where statement 7 and 3 are added. As a result, the soft-SIMD implementation of the constant multiplication of FIG. 4(b) according to embodiments of the present invention requires an extra bit per sub-word and an extra shuffle operation. These extra overheads are typically negligible compared to the gains due the use of SIMD. Besides, the shuffle operator, which is preferably implemented in an energy effective way, can also be used to re-pack sub-words in case the vector configuration needs to be changed, as indicated below.

Architecture Definition

A. Right-Shift Enabled Architecture

As a result of strength reduction optimizations in accordance with embodiments of the present invention, the original program code (first program code) is decomposed into sequences of shift and add/subtract operations, forming the converted program code (second program code). In accordance with embodiments of the present invention, an ASIP data-path architecture is defined which can efficiently execute such sequence of operations.

FIG. 6 shows a Generic Shift-Add/Subtract-Shift (GSAS) unit 60 according to an embodiment of the present invention. It comprises a customized right-shifter RS, an add/subtract unit A/S and a barrel shifter BS. A barrel shifter BS is a digital circuit that can shift a data word by a pre-determined number of bits in one clock cycle. It can be implemented as a sequence of multiplexers. A Generic Shift-Add/Subtract-Shift unit 60 according to embodiments of the present invention can be configured to perform different sequences of the above basic operations in one cycle.

TABLE I

Control signals for executing "a.138" in the GSAS operator according to embodiments of the present invention: 'X' symbolizes 'don't care' and right-shift results in a negative shift factor

| | A | B | C | D | E | F | G | RS | A/S | BS |
|---|---|---|---|---|---|---|---|---|---|---|
| 1: | 0 | 1 | X | 0 | 0 | X | 0 | X | X | 1 |
| 2: | X | 0 | 0 | X | X | 0 | X | −2 | + | X |
| 3: | X | 0 | 2 | X | X | X | 1 | −4 | + | X |

Table I shows how the different multiplexers and operators are configured to, for example, perform the constant multiplication "a.138" of FIG. 4(b). In cycle 1: R1=a<<1; in cycle 2: R2=R1+(R1>>2); in cycle 3: b=R1+(R2>>4). Besides, in cycle 1 'a' is loaded from the Register File RF and in cycle 3, 'b' is stored back to the Register File RF. This constant multiplication requires 3 clock cycles. However, in case that 'a' is the result of a previous add/subtract operation, the GSAS operator according to embodiments of the present invention can perform the previous operation and the left-shift in a single cycle, saving the first cycle of the constant multiplication. In an ASIP according to embodiments of the present invention, this GSAS unit 60 replaces the typical ALU of standard processors.

Figure 7:
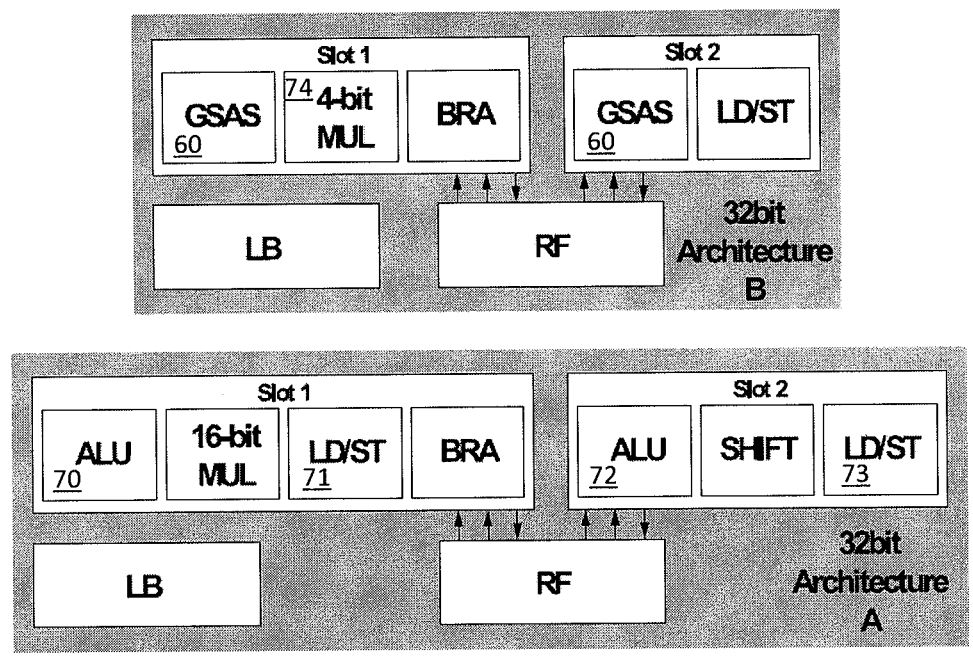
FIG. 7 illustrates a prior art reference ASIP architecture A, and a GSAS-based ASIP architecture B according to embodiments of the present invention.

Two basic ASIP architectures are defined as a reference, and are illustrated in FIG. 7. Both are a 32-bit data-path, 2-issue slot Very Long Instruction Word (VLIW) architectures with a 6-ported RF of 32 entries and a Loop Buffer (LB) 2.

The reference architecture A includes a first ALU 70, a 2-cycle 16-bit multiplier (16-bit MUL), a first load/store unit (LD/ST) 71 and a branch unit (BRA) in the first issue slot and a second ALU 72, a shift unit (SHIFT) and a second load/store unit (LD/ST) 73 in the second issue slot. The architecture B according to embodiments of the present invention includes a GSAS unit 60, optionally a 4-bit multiple-precision multiplier (4-bit MUL) 74 and a branch unit (BRA) in the first issue slot and a second GSAS unit 60 and a load/store unit (LD/ST) in the second issue slot. The architecture according to embodiments of the present invention may still contain a small multiplier which may be used in a multiple precision fashion to execute multiplications with variables. Multiple precision arithmetic breaks a long bit-width operation into multiple shorter bit-widths operations (e.g. a 16-bit multiplication requires 16 4-bit multiplications and the addition of the partial results).

Figure 8:
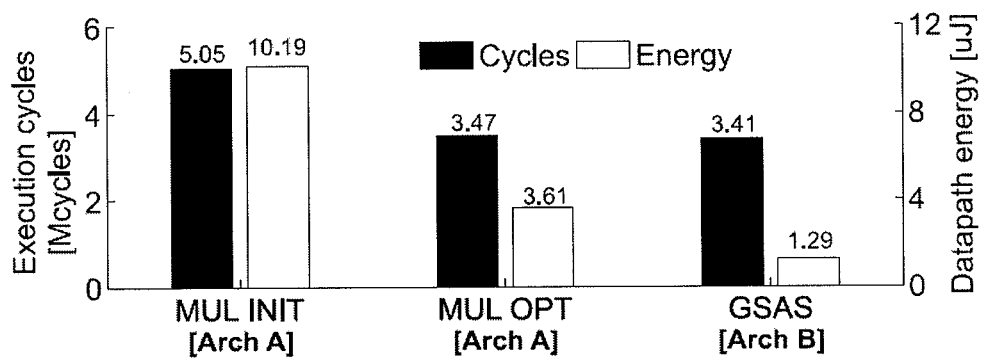
FIG. 8 illustrates execution cycles and data-path energy consumption of different mapping exercises on architectures A and B as illustrated in FIG. 7.

In the experiment, the fixed-point C program code, resulting from a Matlab to C translation, is directly mapped onto the reference architecture A (MUL INIT in FIG. 8). The program code is then optimized (mostly program code transformations which exploit data locality) and mapped again onto the reference architecture A (MUL OPT in FIG. 8). Finally, constant multiplications are converted to right-shift add/subtracts sequences according to embodiments of the present invention and mapped onto the architecture B (GSAS in FIG. 8) according to embodiments of the present invention. FIG. 8 shows the execution cycles and the data-path energy consumption of the different mapping exercises. The data-path comprises the components shown in FIG. 7, namely RF, FU (ALU) and LB. The optimized mapping onto the reference architecture A reduces the cycles required by a factor 1.45 and the data-path energy consumption by factor 2.82. The mapping onto the architecture B according to embodiments of the present invention also reduces the required cycles by a similar factor. However, it also substantially reduces the energy consumption: by a factor 7.90 compared to the reference mapping MUL INIT and by a factor 2.8 compared to the MUL OPT. Despite the fact that most of the constants multiplications required 3 cycles in the GSAS operator according to embodiments of the present invention (as opposed to the 2-cycles 16-bit multiplication of architecture A), architecture B according to embodiments of the present invention still outperforms architecture A based on the MUL OPT mapping. One of the reasons is that some sequences of operations that in architecture A require 2 cycles can be performed in a single cycle in architecture B. Moreover, the use of the GSAS operator 60 in accordance with embodiments of the present invention instead of the 16-bit multiplier causes a considerable increase in energy efficiency.

B. Soft-SIMD Enabled Architecture

Figure 9:
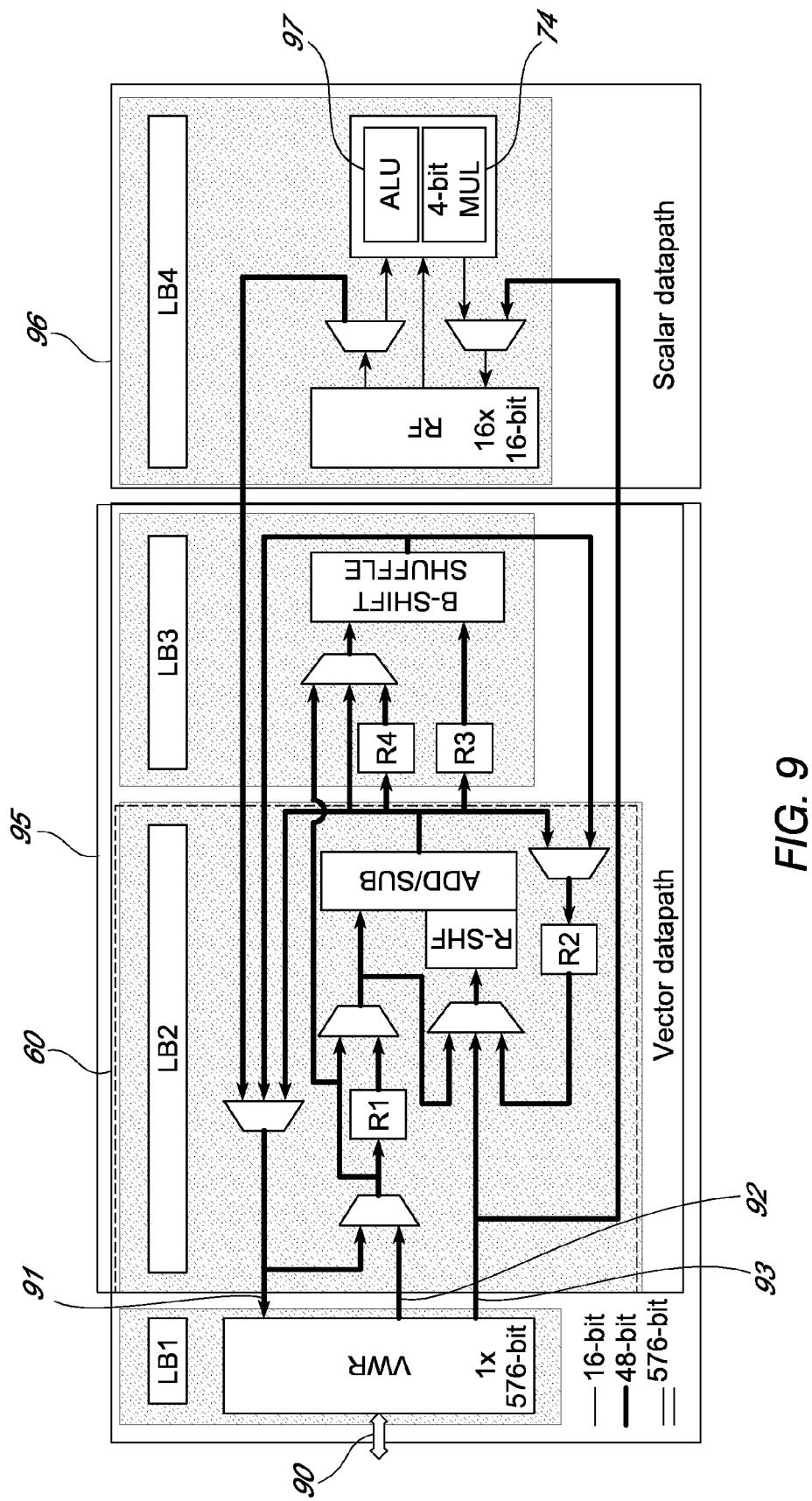
FIG. 9 illustrates the GSAS unit of FIG. 6 extended in accordance with embodiments of the present invention to support soft-SIMD.

In accordance with embodiments of the present invention, the GSAS unit 60 of FIG. 6 may be extended to support soft-SIMD. The thus obtained new ASIP architecture as illustrated in FIG. 9, further called architecture C, in the example illustrated includes a 48-bit vector data-path and a 16-bit scalar data-path. The data-path of the example has been chosen to be 48-bit as it allows the various vector combinations to operate on different configurations, such as 2×24 bit, 3×16 bit, 4×12 bit, 6×8 bit or 8×6 bit; however, the invention is not limited thereto. In order to facilitate the change between different vector configurations, a shuffle unit (B-SHIFT SHUFFLE) and two registers (R3 and R4) have been introduced in accordance with embodiments of the present invention. Besides, the shuffle unit may also be used for avoiding sub-word interferences as discussed above. The two registers R3, R4 enable an efficient change of vector configuration when going to smaller sub-words. The register file RF is upgraded to a Very Wide Register (VWR) which includes a wide port 90 for background memory, e.g. SRAM, interface (e.g. 576 bits) and three ports 91, 92, 93 (2 read ports 92, 93 and 1 write port 91) of the width of the vector data path, e.g. 48-bit ports, to interface with the vector computation unit 95. The VWR is dimensioned to store a predetermined number of words of the width of the vector data-path, e.g. 12 words of 48-bit each. Such a configuration significantly reduces data memory energy consumption as well as that of the register file. The scalar slot 96 comprises a standard ALU 97 and a 4 bit multiplier 74 as introduced above. Explicit communication between the two data-paths may be available. However, this may be infrequently used. The vector data-path 95 may be adapted for executing data-dominant loops while the scalar slot 96 may be adapted for executing the non-kernel program code. Four distributed loop buffers (LB1-LB4) control the different components of the architecture. This distribution on the low level instruction hierarchy leads to significant energy savings as just the required components at a given instant are activated.

As an example, a Gauss filter which is responsible for most of the complexity of a detection algorithm of a particular application has been mapped onto the vector data-path 95 on the architecture C described in FIG. 9. An image filter multiplies element-wise an array of 3×3 coefficients by 3×3 image pixels and accumulates the result. This is repeated for every pixel of an input image. The input data is packed into 8-bit sub-words. Throughout the Gauss filter processing, the dynamic range of the data changes and thus data words are re-packed first to 12-bit sub-word, then to 16-bit sub-word and finally back to 12-bit sub-word.

The energy consumption of the resulting mapping is compared with other mapping exercises and other architectures in FIG. 13. MUL INIT is the initial mapping of the Gauss filter on architecture A and GSAS is the optimized mapping on architecture B (see FIG. 7). The reported energy consumption not only includes the data-path but also the energy consumed in the SRAM memory. The total energy consumption of the GSAS mapping (on ASIP-B) is reduced by a factor 4.45 compared to the MUL INIT mapping (on ASIP-A). This is further reduced in the Soft-SIMD mapping (on ASIP-C), with a factor 39 and 8.78 compared to the MUL INIT and GSAS mapping, respectively. Moreover, FIG. 13 also shows the energy breakdown for the different components. In architecture A and B this is dominated by the RF, as the LB significantly reduces instruction memory consumption. Instead, the FU is the main consumer in the Soft-SIMD mapping according to embodiments of the present invention. Clearly, the VWR has significantly reduced the RF energy consumption. Such a breakdown is close to optimal as the FUs are the component which perform the actual computation.

To summarize, a new on-line monitoring ASIP architecture has been presented. This effectively uses bit-width information to break 'expensive' operations into 'cheap' ones which may then be parallelized in Soft-SIMD fashion. Besides, Very Wide Register and distributed loop buffers may be used to reduce data and instruction memory energy consumption. This combination has shown significant gains in energy efficiency compared to traditional DSP architectures.

It is an advantage of embodiments of the present invention that the basic components and the mapping techniques present in the final architecture can be re-instantiated for other applications which are also loop dominated, exhibit multiple bit-widths and require a relatively limited number of variable multiplications.

Architecture Example

The Soft-SIMD concept according to embodiments of the present invention is, in an example, applied to a multiplication loop of a particular detection algorithm. A hybrid approach is used for the required correction operations that consist of the combination of the worst case sub-word and of one shuffler. Instead of using always the worst-case sub-word, an intermediate sub-word can be used. Whenever more space is required, repacking operations are applied to the already packed words by a shuffler. The analysis of the operations performed on the multiplication loop of the detection algorithm determines the intermediate sub-word that should be used for the packing of the data. It should be mentioned that the loop should be split into two loops, one that uses Soft-SIMD over x and another that uses Soft-SIMD over y. Otherwise the SIMD directions are not compatible. For the correct modeling of the benchmark, the GSAS intrinsics are used due to the fact that the shift operations performed by the second shifter can be performed by the shuffler in one cycle. Moreover, a new intrinsic is inserted for modeling the repacking operations performed by the shuffler.

Figure 17:
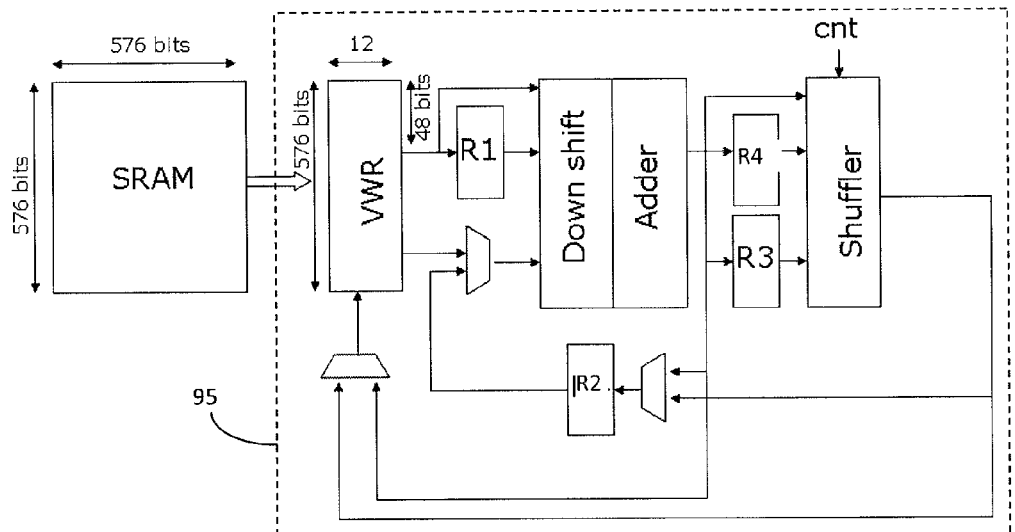
FIG. 17 illustrates an architecture according to embodiments of the present invention for mapping a multiplication loop implemented with sequences of shift and addition operations using Soft-SIMD.

An architecture GSAS FU (Generic Shift Add Shuffle Function Unit) according to a particular embodiment of the present invention for the implementation of Soft-SIMD is illustrated in FIG. 17 and comprises one shifter (DOWN SHIFT), one adder (ADDER), one shuffler (SHUFFLER) and four registers (R1, R2, R3, R4). The R1 register is used for keeping constant the packed word that is read from the VWR (Very Wide Register). The R2 is used for feedback from the shifter and the adder. The R3 and the R4 registers are used for storing the packed words required for the repacking operations. The VWR is able of storing a predetermined amount of packed words, in this case for example 12.

The R3 and R4 registers are provided to avoid processor stalls when the shuffler operations select words consisting of sub-words that are part of 2 consecutive initial words produced in the data path. That will happen in almost any algorithm because of the partial reordering that is needed for these sub-words. In addition to the 2 registers, also an extra stage of multiplexers may be added in the shuffler block that precedes the conventional shuffler router. These multiplexers allow to select specific sub-word combinations across the R3 and R4 registers, but they are restricted to the sub-word granularity and do not 'see' the bits inside the sub-words. Moreover, they do not perform sub-word reordering yet. A more conventional shuffler router comprises a partial crossbar which allows both the sub-word reordering and the potential shifting of bits inside the sub-words. Both the multiplexer pre-selection stage and the shuffler router stage may be steered by separate loop buffers that are fed with a heavily minimized set of instruction bits. So the interface between the L1I and the loop buffers has a heavily reduced width to avoid storage area and transfer energy overhead.

Mapping of a multiplication loop on this architecture may be performed as set out below.

As an example, a body loop of the sequential program code of a multiplication loop, e.g. a Gauss loop, is illustrated in Table III.

TABLE III

Sequential multiplication loop implemented with sequences of shift and addition operations

```
Sequential program code
for (x = 1; x < N – 1; x++){
    for (y = 2; y < M – 1; y++) {
7 MulRes0 = GSAS1(imsub[x−1][y],imsub[x+1][y],0x0,0x0);
8 MulRes7 = GSAS3(MulRes0,MulRes0,0x8018040,0x20);
9 MulRes4 = GSAS3(imsub[x][y],imsub[x][y],0x60100A0,0x34);
10 imgauss_x[x][y] = GSA1(MulRes7,MulRes4,0x20,0x0);
11 MulRes2 = GSAS1(imgauss_x[x][y−1],imgauss_x[x][y−1],0x20,0x0);
12 MulRes5 = GSAS1(imgauss_x[x][y−2],imgauss_x[x][y],0x0,0x0);
13 imgauss[x][y−1] = GSA1(MulRes5,MulRes2,0x24,0x0);
    }
}
```

The first operation performed is the addition of two image pixels (imsub) using the adder of the GSAS FU (Generic Shift Add Shuffle Function Unit) as illustrated in FIG. 9. Based on the quantization results, the word-length of the imsub variable is equal to 7 bits. The imsub variable is packed in 7-bit sub-words in memory. After performing the addition, the result may have a word-length equal to 8 bits. Therefore, the input variable imsub is repacked to 8-bit sub-words with the use of the shuffle FU in order to avoid later a repack operation, as illustrated in FIG. 18.

The second operation is performed on the output of the addition (first operation) and represents the implementation of the multiplication of the constant $655_{dec}$ using the GSAS FU for 3 cycles. The input has word-length equal to 8 bits while the output of the multiplication needs 9-bit word-length. Due to program code transformations that have been applied to the Gauss loop, the appropriate information about the required intermediate word-lengths is not available. Therefore, a safe assumption that the output needs max(word-length(input1),word-length(input2))=max(8,13) is made. No need exists for interval guards due to the known dynamic range of the variables, hence the word-length of the output is set equal to 12 bits. Analyzing the steps performed during the execution of the sequence of shift and addition operations, the worst-case sub-word is equal to 17 bits. For the rest of the analysis it is assumed that the decision of 17 bits is too safe, so 16 bits are used. That is motivated because the final resolution of results that are passed to the y loop is only 13 bits. For the correct implementation of the Soft-SIMD, the quantization analysis must be reapplied in the transformed program code in order to obtain the accurate required sub-words for each variable. In order to apply correctly the Soft-SIMD, the input needs to be packed in 12 sub-words.

Figures 18, 19, 20, 21, 22:
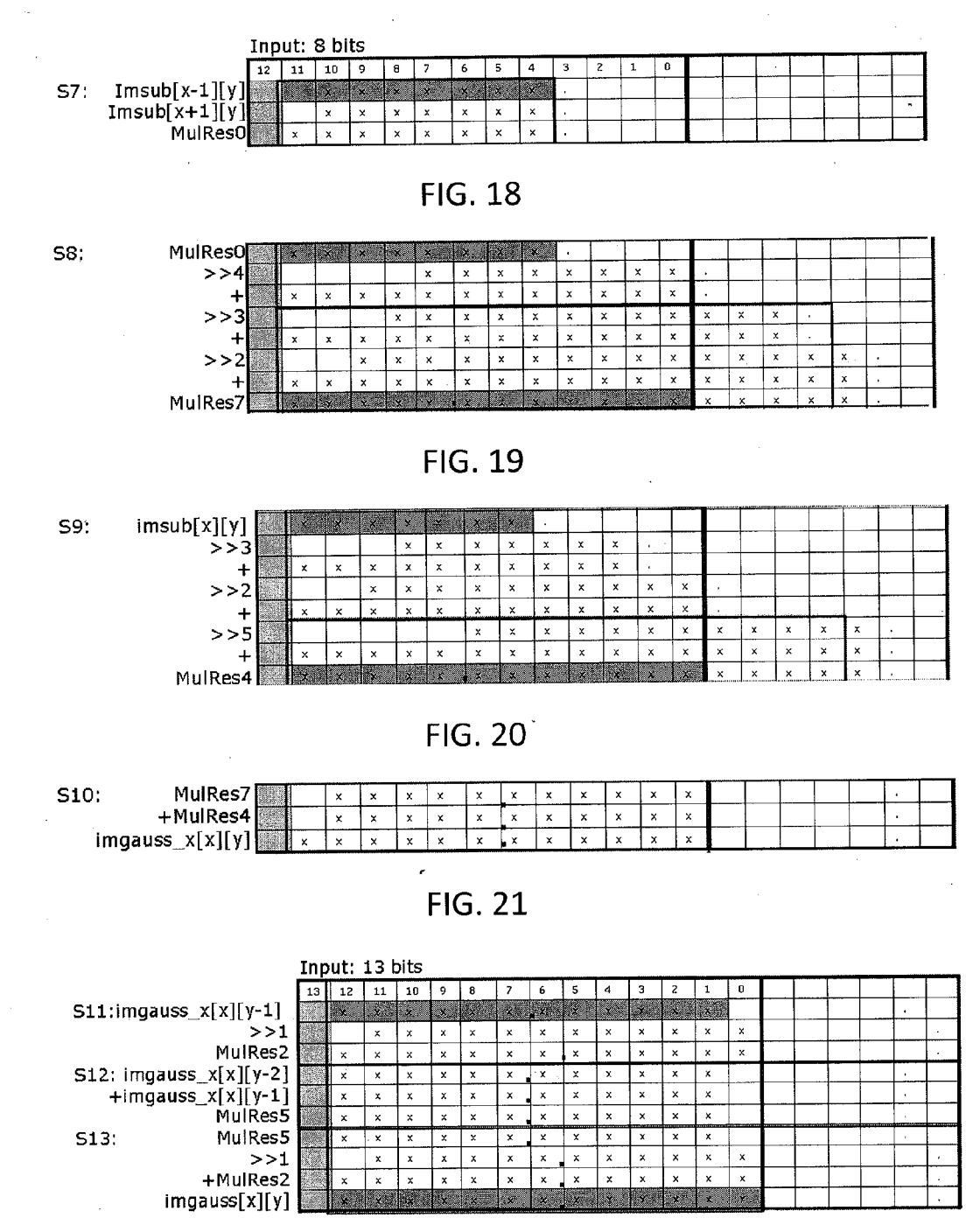

The different cycles of the second operation are illustrated in FIG. 19. During the first cycle the partial product is shifted 4 positions to the right and is still inside the sub-word. The second shift operation passes the partial product outside the sub-word, which indicates that repacking through the shuffle FU of the partial product, and hence of the input, must be performed from 12 bits to 16-bit sub-words. The second and the third cycle are performed on 16-bit sub-words and at the end of the third cycle the result is repacked at 12 bits sub-words using the shuffle FU.

The next operation is performed on the imsub variable, which is packed in 7-bit sub-words in memory, and it is the implementation of the multiplication of the constant $983_{dec}$ using the GSAS FU for 3 cycles. The input has word-length equal to 7 bits while the output of the multiplication requires a 9-bit word-length. As it has been already been mentioned, due to program code transformations that have been applied to the Gauss loop, the appropriate intermediate word-lengths are not known and the safe assumption that the output is equal to 12-bit word-length has again been made. Therefore, the input variable is packed to 12-bit sub-words.

The different cycles of the third operation are illustrated in FIG. 20. The first and the second cycle are shifting the partial product by 3 and by 2 positions to the right respectively, and as a result the output is maintained inside the 12-bit sub-words. For the third cycle of the instruction, repacking of both the partial product and the input to 16-bit sub-words must be made in order to avoid the overlapping of the shifted bits to nearby sub-words. The output is repacked to 12-bit sub-words.

The last operation that can be performed while using Soft-SIMD on x is the addition of the results of the constant multiplications by the adder of the GSAS FU. Both the inputs are packed in 12-bit sub-words, so the addition can be performed without repacking of the variables, as it is illustrated on FIG. 21.

It should be mentioned that shift operations for alignment of the decimal points are also performed during the repacking operations.

The rest of the Gauss body loop consists of operations that are done with Soft-SIMD on y. Between the operations performed using Soft-SIMD on x and Soft-SIMD on y, the output variables of Soft-SIMD on x are passed through the shuffle FU in order to be packed in 13-bit sub-words and then they are stored in the VWR and from there to the data memory.

All the operations using Soft-SIMD on y can be performed without need for repacking since the results are always inside the 13-bit sub-words, as is illustrated in FIG. 22.

Applying the above analysis on the Gauss body loop, the loop is converted to the one depicted on Table IV.

TABLE IV

Parallel multiplication loop using Soft-SIMD on x and on y.

```
Soft-SIMD on x program code
for (x = 1; x < N - 1; x=x+12){
    for (y = 2; y < M - 1; y++) {
        MulRes0_8_a = GSAS1(imsub_8[x-1][y],imsub_8[x+1][y],0x0,0x0);
        MulRes0_8_b = GSAS1(imsub_8[x-5][y],imsub_8[x+7][y],0x0,0x0);
        MulRes0_12_a = REPACK(MulRes0_8_a,0);
        MulRes0_12_b = REPACK(MulRes0_8_a,MulRes0_8_b);
        MulRes0_12_c = REPACK(MulRes0_8_b,0);
        MulRes7_12_a = GSAS3(MulRes0_12_a,MulRes0_12_a,0x8018040,0x20);
        MulRes7_12_b = GSAS3(MulRes0_12_b,MulRes0_12_b,0x8018040,0x20);
        MulRes7_12_c = GSAS3(MulRes0_12_c,MulRes0_12_c,0x8018040,0x20);
        imsub_12_a = REPACK(imsub_8[x][y],0);
        imsub_12_b = REPACK(imsub_8[x][y],imsub_8[x+6][y],2);
        imsub_12_c = REPACK(imsub_8[x+6][y],0);
        MulRes4_12_a = GSAS3(imsub_12_a,imsub_12_a,0x60100A0,0x34);
        MulRes4_12_b = GSAS3(imsub_12_b,imsub_12_b,0x60100A0,0x34);
        MulRes4_12_c = GSAS3(imsub_12_c,imsub_12_c,0x60100A0,0x34);
        imgauss_x[x][y] = GSAS1(MulRes7_12_a,MulRes4_12_a,0x20,0x0);
        imgauss_x[x+12][y] = GSAS1(MulRes7_12_b,MulRes4_12_b,0x20,0x0);
        imgauss_x[x+24][y] = GSAS1(MulRes7_12_c,MulRes4_12_c,0x20,0x0);
    }
}
Soft-SIMD on y program code
for (x = 1; x < N - 1; x++){
    for (y = 2; y < M - 1; y=y+3) {
        MulRes2 = GSAS1(imgauss_x[x][y-1],imgauss_x[x][y-1],0x20,0x0) ;
        MulRes5 = GSAS1(imgauss_x[x][y-2],imgauss_x[x][y],0x0,0x0 );
        imgauss[x][y-1] = GSAS1(MulRes5,MulRes2,0x24,0x0);
    }
}
```

Figure 23:
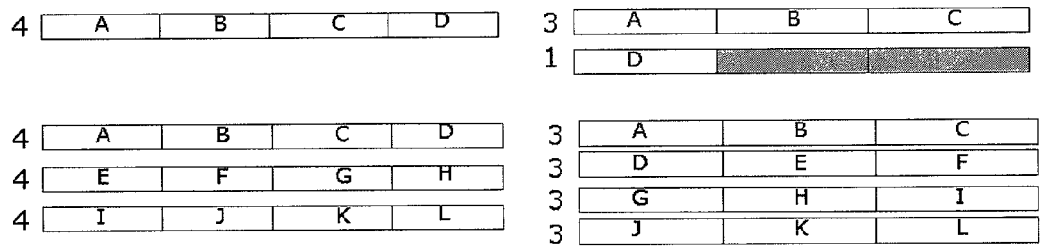
FIG. 23 illustrates unrolling of operations for full utilization of packed words.

It is mentioned that the data path width is set equal to 48 bits, so the packed data with 8-bit sub-words consist of 6 different data, the packed data with 12-bit sub-words consist of 4 different data and the packed data with 16-bit sub-words consist of 3 different data. In order to have full use of the packed bits using different sub-word each time, the program code must be partially unrolled, as is illustrated on the example of FIG. 23.

The operations performed on 8-bit sub-words are unrolled once and the operations performed on 12-bit sub-words are unrolled twice in order to create 12 different data that completely full each packed word. The program code in the Table IV illustrates the converted Gauss loop in which Soft-SIMD on x and Soft-SIMD on y have been applied.

The correct modeling of the Soft-SIMD may be performed by unrolling the operations that need more that one cycle. This may be done due to the need for repacking between the cycles that execute the sequence of shift and addition operations, especially when the shifting factor pushes the sub-word out of its available data-path width. This fact indicates that one cycle is required for executing the shift and addition operation and another cycle for the repacking operation through the shuffler. Furthermore, it should be stressed that cases exist in which the shifter, the adder and the shuffler can be executed in one cycle by bypassing the pipeline registers before the shuffler. The transformed Gauss loop using Soft-SIMD is illustrated in the Table V.

TABLE V

Unrolled parallel multiplication loop using Soft-SIMD on x and on y.

```
Soft-SIMD on x program code
for (x = 1; x < N − 1; x=x+12){
    for (y = 2; y < M − 1; y++) {
        MulRes0__8__a = GSA1(imsub__8[x−1][y],imsub__8[x+1][y],0x0) ;
        MulRes0__8__b = GSA1(imsub__8[x+5][y],imsub__8[x+7][y],0x0) ;
        MulRes0__12__a = REPACK(MulRes0__8__a,0);
        MulRes0__12__b = REPACK(MulRes0__8__a,MulRes0__8__b);
        MulRes0__12__c = REPACK(MulRes0__8__b,0);
        MulRes0__16__a = REPACK(MulRes0__8__a,0);
        MulRes0__16__b = REPACK(MulRes0__8__a,0);
        MulRes0__16__c = REPACK(MulRes0__8__b,0);
        MulRes0__16__d = REPACK(MulRes0__8__b,0);
        MulRes7__12__a = GSA1(MulRes0__12__a,MulRes0__12__a,0x40);
        MulRes7__12__b = GSA1(MulRes0__12__b,MulRes0__12__b,0x40);
        MulRes7__12__c = GSA1(MulRes0__12__c,MulRes0__12__c,0x40);
        MulRes7__16__a = REPACK(MulRes7__12__a,0);
        MulRes7__16__b = REPACK(MulRes7__12__a,MulRes7__12__b);
        MulRes7__16__c = REPACK(MulRes7__12__b,MulRes7__12__c);
        MulRes7__16__d = REPACK(MulRes7__12__c,0);
        MulRes7__16__a = GSA1(MulRes7__16__a,MulRes0__16__a,0x60);
        MulRes7__16__b = GSA1(MulRes7__16__b,MulRes0__16__b,0x60);
        MulRes7__16__c = GSA1(MulRes7__16__c,MulRes0__16__c,0x60);
        MulRes7__16__d = GSA1(MulRes7__16__d,MulRes0__16__d,0x60);
        MulRes7__16__a = GSA1(MulRes7__16__a,MulRes0__16__a,0x20);
        MulRes7__16__b = GSA1(MulRes7__16__b,MulRes0__16__b,0x20);
        MulRes7__16__c = GSA1(MulRes7__16__c,MulRes0__16__c,0x20);
        MulRes7__16__c = GSA1(MulRes7__16__d,MulRes0__16__d,0x20);
        MulRes7__12__a = REPACK(MulRes7__16__a,MulRes7__16__b);
        MulRes7__12__b = REPACK(MulRes7__16__b,MulRes7__16__c);
        MulRes7__12__c = REPACK(MulRes7__16__c,MulRes7__16__d);
        imsub__12__a = REPACK(imsub__8[x][y],0);
        imsub__12__b = REPACK(imsub__8[x][y],imsub__8[x+6][y]);
        imsub__12__c = REPACK(0,imsub__8[x+6][y]);
        imsub__16__a = REPACK(imsub__8[x][y],0);
        imsub__16__b = REPACK(imsub__8[x][y],imsub__8[x+6][y]);
        imsub__16__c = REPACK(imsub__8[x][y],imsub__8[x+6][y]);
        imsub__16__d = REPACK(0,imsub__8[x+6][y]);
        MulRes4__12__a = GSA1(imsub__12__a,imsub__12__a,0x60);
        MulRes4__12__b = GSA1(imsub__12__b,imsub__12__b,0x60);
        MulRes4__12__c = GSA1(imsub__12__c,imsub__12__c,0x60);
        MulRes4__12__a = GSA1(MulRes4__12__a,imsub__12__a,0x60);
        MulRes4__12__b = GSA1(MulRes4__12__b,imsub__12__b,0x60);
        MulRes4__12__c = GSA1(MulRes4__12__c,imsub__12__c,0x60);
        MulRes4__16__a = REPACK(MulRes4__12__a,0);
        MulRes4__16__b = REPACK(MulRes4__12__a,MulRes4__12__b);
        MulRes4__16__c = REPACK(MulRes4__12__b,MulRes4__12__c);
        MulRes4__16__d = REPACK(MulRes4__12__c,0);
        MulRes4__16__a = GSA1(MulRes4__16__a,imsub__16__a,0x60);
        MulRes4__16__b = GSA1(MulRes4__16__b,imsub__16__b,0x60);
        MulRes4__16__c = GSA1(MulRes4__16__c,imsub__16__c,0x60);
        MulRes4__16__d = GSA1(MulRes4__16__d,imsub__16__d,0x60);
        MulRes4__12__a = REPACK(MulRes4__16__a,MulRes4__16__b);
        MulRes4__12__b = REPACK(MulRes4__16__b,MulRes4__16__c);
        MulRes4__12__c = REPACK(MulRes4__16__c,MulRes4__16__d);
        imgauss__x[x][y]= GSA1(MulRes7__12__a,MulRes4__12__a,0x20);
        imgauss__x[x+4][y]= GSA1(MulRes7__12__b,MulRes4__12__b,0x20);
        imgauss__x[x+8][y]= GSA1(MulRes7__12__c,MulRes4__12__c,0x20);
    }
}
```

TABLE V-continued

Unrolled parallel multiplication loop using Soft-SIMD on x and on y.

```
Soft-SIMD on y program code
for (x = 1; x < N – 1; x++){
    for (y = 2; y < M – 1; y=y+3) {
        MulRes2 = GSA1(imgauss_x[x][y–1],imgauss_x[x][y–1],0x20,0x0);
        MulRes5 = GSA1(imgauss_x[x][y–2],imgauss_x[x][y],0x0,0x0 );
        imgauss[x][y–1] = GSA1(MulRes5,MulRes2,0x24,0x0);
    }
}
```

Figure 24:
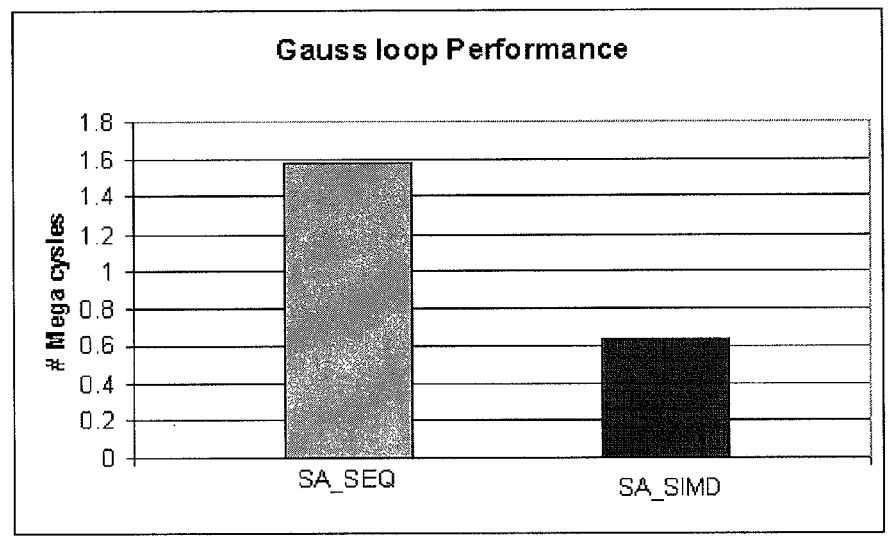
FIG. 24 illustrates a performance comparison of the sequential multiplication loop and of the parallel multiplication loop using Soft-SIMD according to embodiments of the present invention, both implemented with sequences of shift and addition operations.

The performance and the scheduling obtained for the Gauss loop and the architecture with one data cluster and two slots are depicted in the FIG. 24 and FIG. 25.

Data Parallel Soft-SIMD ASIP Data-Path Organization and Mapping

The single instruction multiple data (SIMD) instructions are used to increase the performance of applications since they execute one instruction on different data at the same time. The SIMD exploits the data parallelism that is contained in applications, for e.g. in multimedia.

The use of SIMD without hardware support (Soft-SIMD), as it has been mentioned, requires the insertion of extra operations for the packing and the unpacking of the data in order to meet the functional correctness. When execution of an operation is performed on a regular data path on a packed word, where each sub-word describes different data, each sub-word must be independent from the others. That means that the operation performed on the packed word guarantees that each sub-word does not overwrite the nearby sub-words.

In order to guarantee that the sub-words are separated, guard intervals are introduced between the different sub-words, therefore reducing the bits that can be used for computation. The simplest guard interval is a zero bit that can be used only for positive operands. In case that one operand is negative, or even a subtract operation is performed, then a modified guard interval is required due to the two's complement representation of the numbers and to the sign extension. Instead of modifying the guard intervals, which leads to insertion of overhead due to additional operations, the SIMD can be guaranteed to operate only to positive operands, e.g. when all input and output values are always positive. That is true e.g. for the image data in a Gauss filter loop.

Considering the application of Soft-SIMD to constant multiplications, both the operands of the multiplication must be positive in order to have a positive output. The constant multiplications consist of the multiplicand and the multiplier that is a constant value. In order to guarantee that the multiplicand is always positive an offset is added to it. This offset may be defined by the multiplicand's range. In case the multiplication is performed using a negative constant, then the multiplication is performed using the absolute value of the constant and after the unpacking of data, the result of the output is negated. It should also be stressed that the multiplication operations are difficult to be implemented with SIMD due to the fact that the output of the multiplication has an increased word-length. When the constant multiplications are converted to sequences of shift and addition operations in accordance with embodiments of the present invention, the data can be parallelized easier due to the smaller increase to the word-length of the output.

In addition, the CSD (Canonical Signed Digit) representation of the constant may indicate subtraction between the shifted multiplicands. Consequently, care must be taken in order to guarantee that the result of the subtraction is always a positive value. This can be achieved by modifying the way the shift operations are performed. This means that in case of a subtraction, the shift factor that corresponds to the more important position of non-zero digits in CSD coding, must always have a positive coefficient. The modification of the sequence of shift and addition operation, for the constants used in the multiplications of the detection algorithm, in order to have positive intermediate results and positive final output is illustrated in Table II.

TABLE II

Modification of the sequence of shift and addition operations in order to have always positive result

|  | Coefficient 1 | Coefficient 2 | Factor 1 |
|---|---|---|---|
| Constant | 655 | 983 | 3 |
| Binary | 1010001111 | 1111010111 | 11 |
| CSD coding | 101001000- | 10000-0-00- | — |
| a*constant | (((-a>>4)+a)>>3+a)>>2+a | (((-a>>3)-a)>>2-a)>>5+a<br>(-((a>>3)+a)>>2-a)>>5+a<br>-(((a>>3)+a)>>2+a)>>5+a | [((a>>1)+a)] |

Figure 11:
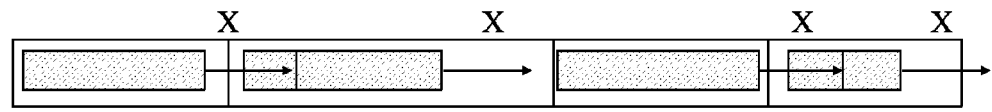
FIG. 11 illustrates overlapping of sub-words due to shift operations.

As long as the positive value of the results and of the variables is guaranteed, the effect of the different operations, which are executed on the packed words, can be taken into account. The conversion of constant multiplications to sequence of shift and addition operations in accordance with embodiments of the present invention means that only shift operations and addition operations are performed on the packed words. Performing an addition to the packed word is straightforward when the sub-words have a width that guarantees no overflow, e.g. is equal to the maximal range of each data, and so no guard intervals are required. In contrast, the influence of the shift operation depends on the applied shift factor and on the used sub-word. Care must be taken for the right shift operations not to overwrite the MSBs of the previous sub-word, as is illustrated in FIG. 11, where the values are shifted by x positions to the right.

Different approaches can be used for discarding the bits which are entering in the previous sub-word due to the right shift operation, in order to maintain the functional correctness (avoiding sub-word overlapping).

The overlapping between the sub-words in the same packed word that is caused by the right shift operations may be avoided by discarding the bits, which are entering into, the previous sub-word. In accordance with embodiments of the present invention, the discarding of the bits can be performed a priori, so the shifted bits can never overlap with nearby sub-words, or, in alternative embodiments, it can be postponed for later in case that the overlapped bits of the sub-word are still not valid. Hence, in accordance with embodiments of the present invention, the validation of the MSBs of the nearby sub-word can be verified dynamically, leading to the postponing of the correction operations; accordingly, the cost of the correction operations can be reduced, since they can be combined with other similar operations.

One approach of the correction operations comprises choosing as a sub-word the worst case required intermediate sub-word of the sequence of shift and addition operations. This guarantees that the result will always fit inside its sub-word, without affecting other sub-words. This approach has a loss in efficiency, since a lot of bits, e.g. the worst case sub-word, are used for one data, although they are not always required. The example of FIG. 12 illustrates the effect of the application of the shift and addition operations, which are derived from the constant $655_{dec}$. The data path width is equal to 13 bits while the input's word-length is equal to 7 bits. The worst case required word-length is equal to 17 bits.

Figure 10:
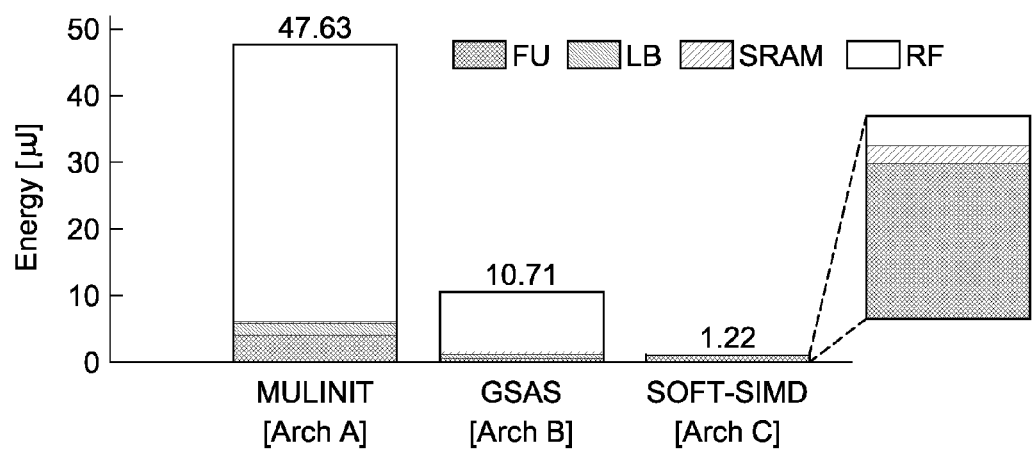
FIG. 10 illustrates masking operation for functional correctness in Soft-SIMD.

A second approach is illustrated in FIG. 10 and refers to the insertion of extra masking operations in order to prohibit the shifted bits to influence the previous sub-word. The FU that performs the masking operations loads from memory to the RF the required masks and it executes them on the packed word. This reduces the cost of this FU to reasonable values, which are linear to the number of required bits for the mask and furthermore it avoids the exponential rise of the mask data that should be stored. Every mask is loaded at run-time from the memory when it is required. This approach is more advantageous when the values of the masks are known up-front and they do not differ a lot during the execution of the application. Hence, the temporal reuse and locality of the mask data should be high.

A third approach is illustrated in FIG. 14 and comprises using a shuffle FU for discarding the bits that are going to overlap with nearby sub-words. The shuffler FU is able of performing different operations like rotation, packing, unpacking shifting and repacking operations. The shuffle FU is more advantageous when strong spatial locality is present among the fields that should be overwritten and when parts of the bits must be removed, for example during repacking, rotation or even sign extension. It should be mentioned that the shuffle FU is much more costly than the masking operations when random bits must be overwritten. So they have complementary usage domains. The shuffle FU may be the B-SHIFT SHUFFLE illustrated in FIG. 9.

Figure 15:
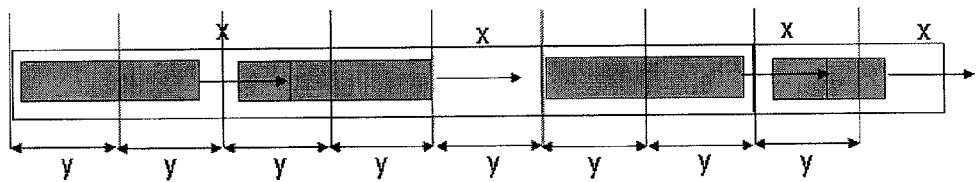
FIG. 15 illustrates hardware points for functional correctness in Soft-SIMD.

A fourth approach is illustrated in FIG. 15 and comprises a hybrid combination of Soft-SIMD and Hard-SIMD and is referring to the insertion of variant checking points in the hardware that are able to remove the shifted bits when they are going to pass to another sub-word. The checking points are equally spread to the packed word every y bits, where y is equal to a number that is not too costly but at the same time allows the implementation of Soft-SIMD, e.g. the flexibility in the sub-words. This FU is used only for the implementation of the Soft-SIMD, hence, it takes small area and consumes low energy. The main disadvantage is that it represents a very dedicated FU which is only required for supporting the Soft-SIMD approach. Hence the design time, area and energy overhead (due to longer wiring distances) it requires are not always beneficial.

Taking into account the different approaches for avoiding the overlap between the different sub-words due to right shift operations, a combination of first approach, i.e. the worst case sub-word, and the third approach, i.e. the shuffle FU, is considered most advantageous for the implementation of the Soft-SIMD in accordance with embodiments of the present invention. An intermediate sub-word is used, which is smaller than the worst case and in case that more bits are required, the packed words are repacked using the shuffle FU.

Quantization

Efficient quantization is another possibility for an efficient implementation of any embedded application on hardware. The quantization is an enabling step for efficient mapping of program code on an ASIP (application specific instruction set processor) architecture.

An architecture instance in accordance with embodiments of the present invention, for example for a biomedical image processing example, is shown in FIG. 9, as indicated above. This architecture shows an instance of an ASIP to show how the different components are connected to each other.

Wireless functionality is initially designed with floating point precision. The latter offers high dynamic range and abstracts away the binary point by normalizing the operation output. These properties permit the designer to focus on the communication functionality and ignore any precision consideration. However, floating point arithmetic requires complex operators which first need to separately process mantissa and exponent and then normalize the result when required. This leads to expensive implementations in terms of area, energy and delay.

Alternatively, fixed-point arithmetic requires less bits and simpler operators which are directly translated into savings in area, energy and delay. Unfortunately, fixed-point arithmetic introduces an unavoidable quantization error which degrades floating point performances. Thus, a conversion from a floating point to a fixed-point description is required when high processing efficiency is desired. In this conversion process, the introduced processing degradation needs to be kept under control.

Fundamentally, wireless communication systems are designed to function under different environmental conditions. They are inherently robust to channel distortion and noise. This noise robustness varies for the different communication modes (combination of modulation scheme and coding rate), thereby offering different compromises between data rate and area coverage. Consequently, implementations of wireless communications systems tolerate transformations where the I/O trueness does not need to be fully maintained as long as the output signal integrity is met (e.g. SNR). This implies that the system can accommodate a certain amount of quantization noise without having any impact on the communication performance. This tolerance varies depending on the system configuration and on conditions external to the transducer, such as the variations coming from the environment and the user.

Consequently, wireless digital signal processing precision requirements depend on environmental conditions and user requirements. Therefore the fixed-point description should be derived from these two sources, which are inherently varying over time. To avoid worst case dimensioning in such dynamic conditions, data-format assignment could be ported to the run-time. However, run-time processing causes overhead, in terms of energy and processing cycles, and therefore should be minimized. For cheap adaptability, a scenario-based design approach is proposed in accordance with embodiments of the present invention.

Scenario-based data-format assignment implies the clustering of the many different environmental/user run-time situations into a smaller set of different scenarios. For each of these scenarios a specific implementation is thoroughly optimized at design-time. Then at run-time, a simple controller senses the external conditions to identify the current scenario and selects the corresponding optimized implementation. The duty cycle of such a controller should be very low, resulting in a negligible overhead.

The minimal quality of the wireless link that guarantees a predetermined communication performance (e.g. data rate) depends on the length of transmitted data that contains a CRC (Cyclic Redundancy Check) appended. This length defines the minimum portion of data that can be received and checked for correctness. If the CRC gives an error, the entire data segment associated will be retransmitted (packet retransmission). Interestingly, depending on the data segment length, a different BER (Bit Error Ratio) will be desired in order to meet a packet. Besides, for achieving a given BER, the different system configurations (combinations of modulation scheme and coding rate) require a different minimal Signal-to-Noise Ratio at the input of the receiver. The smaller this SNR, the shorter the minimum word-lengths required in the receiver digital signal processing.

Figure 16:
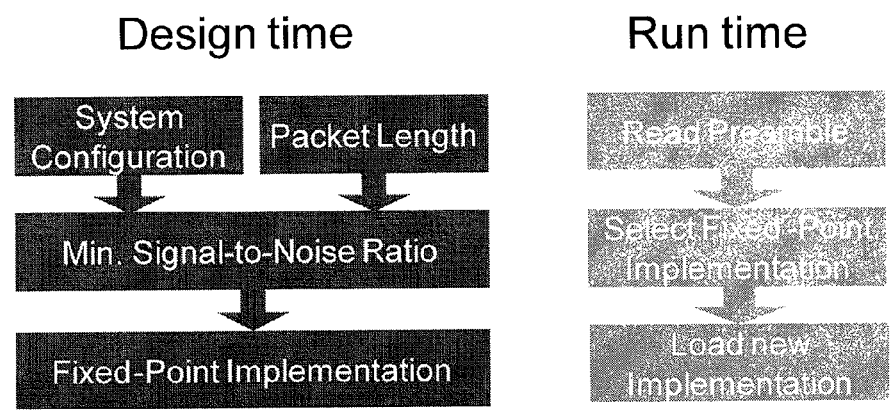
FIG. 16 illustrates scenario-based date-format assignment for wireless applications methodology flow.

FIG. 16 shows the scenario-based data-format assignment for wireless applications methodology flow. At design time, the maximum BER that still meets different packet lengths can be derived. BER floating point simulations of the communication system are used to determine the minimum required SNR (Signal to Noise Ratio) which provides that maximum BER under different system configurations. Finally, the precision of the receiver digital signal processing is optimized for that maximum SNR.

At run-time, the current system configuration and the packet length is extracted from the preamble. The fixed point representation that guarantees a successful reception with minimum energy cost is selected and loaded.

No explicit measure of SNR is considered in the approach according to embodiments of the present invention. This is advantageous since the instantaneous SNR is a parameter difficult to estimate accurately due to short observation window and its potential fast variations. In case the real SNR is below the considered 'minimum SNR', the wireless performance will not be guaranteed independently on the fixed point degradation. In case the real SNR is bigger, the fixed point degradation that is negligible for the derived 'minimum SNR', it will have an even smaller contribution to the current SNR.

In a further aspect of the present invention, an accurate estimation of the energy that is consumed in the data path of the processor is dealt with. The energy consumption of the data path of the processor is divided into the FU energy and the energy that is consumed in the distributed LB which is responsible for storing the control bits for the correct execution of the instructions.

In first instance, the consumed energy for the transformed sequential multiplication loop of the 2D Gauss filtering is estimated initially and compared with the original program code.

The data path energy of the processor consists of the energy that the FUs are consuming and the consumed energy of the LB, which stores the control bits of the FUs. For the energy estimation is considered a 40 nm TSMC technology, a clock with frequency equal to 200 MHz and a data path width equal to 16 bits. The Table VI illustrates the energy that each FU consumes.

TABLE VI

Power and energy consumption for the different FUs.

| FU | Power per activation (µW) | Energy per activation (fJ) |
| --- | --- | --- |
| Multiplier | 810 | 4050 |
| Adder | 45 | 225 |
| Shifter | 20 | 100 |
| SA | 100 | 500 |

The adder and shifter are based on accurate synthesis results, starting from VHDL code. The shifter is assumed to have a limited shift factor though. When that shift factor goes up to the required range of 5 bits, the power will go up to about 40 µW. However the total power for the entire SA data path logic should not exceed 100 µW, including the power of the pipeline register and the muxes. For the 16*16 bit multiplier a rather optimistic estimate has been made, because some results indicate a loss of up to a factor of 20 compared to a 16 bit adder.

The FU energy is estimated by Equation (Eq. 3), where $E_M$ is the energy consumed by one activation of the multiplier and ESA the energy consumed by one activation of the SA FU. In order to estimate the total energy consumed, the above energies should be multiplied by the total number of activations, respectively.

$$E_{FU}=(E_M*\#MUL)+(E_{SA}*\#SA) \quad \text{Eq. (3)}$$

Figures 26, 31:
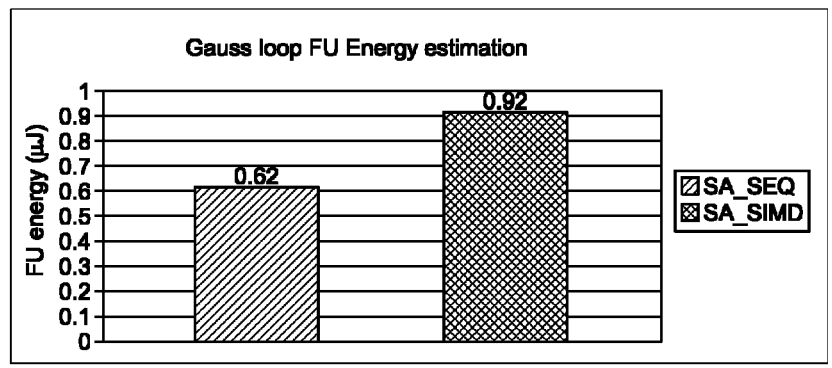
FIG. 26 illustrates software scheduling of a tool used for performing the multiplication loop for a) the original program code using multiplications and b) the transformed program code using SA FU according to embodiments of the present invention.
FIG. 31 illustrates FU energy comparison of sequential multiplication loop implemented to SA FUA and parallel multiplication loop using Soft-SIMD implemented to Shift-Add-Shuffler FU in accordance with embodiments of the present invention.

The total number of activations is equal to the number of operations performed in one iteration of the loop multiplied by the total number of iterations. The operations performed in one iteration of the loop are derived from the scheduling of the tool, as illustrated in FIG. 26, excluding the operations that are responsible for the addressing of the operands and the load and store instructions.

Figure 27:
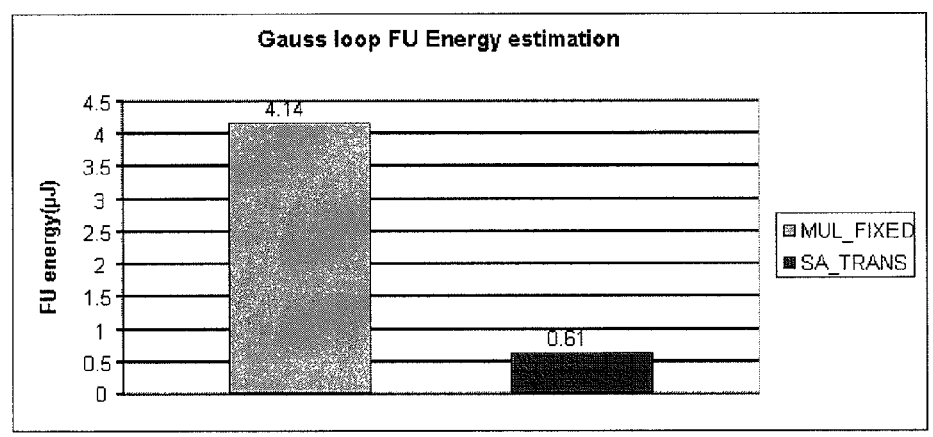
FIG. 27 illustrates FU energy comparison of original multiplication loop implemented to multiplier FU and transformed multiplication loop implemented to SA FU according to embodiments of the present invention.

The energy estimation of the FUs of the architecture with 1 data cluster and two slots for the multiplication loop is depicted in FIG. 27.

The LB (loop buffer) energy is estimated by two bounds, one pessimistic and one optimistic. The $E_{RMul}$ and $E_{RSA}$ is the required energy for reading one instruction of multiplication and one instruction of SA from the LB, respectively. The energy for reading one instruction is calculated by multiplying the energy consumed when reading one Flip Flop (FF) ($E_{FF}$=5 fJ) by the number of required Flip Flops for storing the instruction, e.g. the width of the instruction W. The $W_{MUL}$ and $W_{SA}$ are the necessary control bits for each instruction, e.g. 6 bits for the SA and 12 bits for the multiplier. In order to estimate the total energy consumed by the LB, the energy of each instruction should be multiplied by the total number of reads. The optimistic approach is calculated by Equation (Eq. 4). Here is assumed that selecting the appropriate LB word to be read is not reflected in the access energy, which provides of course only a lower bound.

$$E_{LBopt}=E_{RMul}*\#MUL+E_{RSA}*\#SA \quad \text{Eq. (4)}$$

where:
$E_{RMul}=E_{FF}*W_{MUL}$
$E_{RSA}=E_{FF}*W_{SA}$

In the most pessimistic energy estimation of the LB it is assumed that the read energy is proportional to the depth of the LB, as shown in FIG. 28. The consumed energy is calculated from the Equation (Eq. 5).

$$E_{LBpess}=E_{LBOPT}*LB_{DEPTH} \quad \text{Eq. (5)}$$

The reality will be in between of these bounds but the upper bound is selected for further experiments to ensure that the overall gains are not overestimated later on.

The energy estimation of the LB for the architecture with 1 data cluster and two slots for the multiplication loop is depicted in FIG. 29.

Now, the effect of the application of the Soft-SIMD on the multiplication loop will be compared with the sequential version of the program code. Moreover, an estimation of the overall architecture according to embodiments of the present invention for mapping the Soft-SIMD will take place.

The data path energy of the processor consists of the energy that the FUs are consuming and the consumed energy of the LB, which stores the control bits of the FUs. For the energy estimation 40 nm TSMC technology is considered, a clock with frequency equal to 200 MHz and a data path width equal to 48 bits. The Table VII illustrates the energy that each FU consumes.

TABLE VII

Power and energy consumption for different FUs.

| FU | Power per activation (µW) | Energy per activation (fJ) |
|---|---|---|
| Shuffler | 360 | 1800 |
| SA | 300 | 1500 |

The shuffler is based on a worst-case VHDL synthesis experiment. In addition, the SA power is overestimated as it is assuming a factor of 3 more power for the 48 bit data path compared to the initial one for the 16 bit data path.

Figures 30, 32:
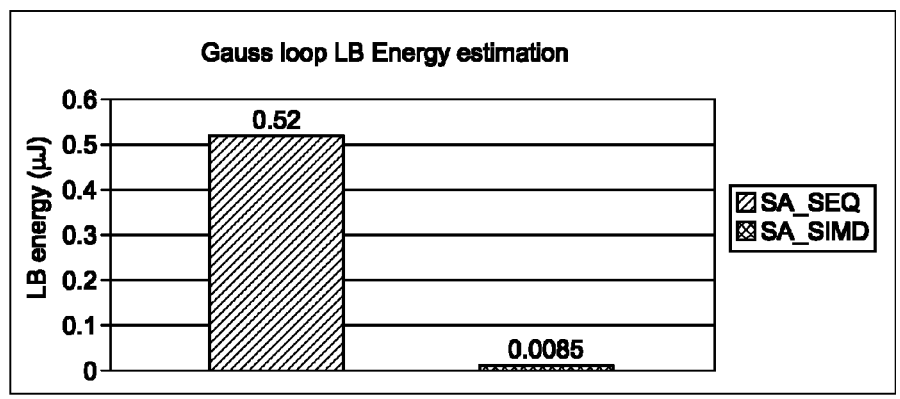
FIG. 30 illustrates software scheduling deriving from the tool used for the parallel multiplication loop using Soft-SIMD on x and on y.
FIG. 32 illustrates LB energy comparison of sequential multiplication loop implemented to SA FU and parallel multiplication loop using Soft-SIMD implemented to Shift-Add-Shuffler FU.

The FU energy is estimated by Equation (Eq. 6), $$E_{FU}=E_{FUx}+E_{FUy} \quad \text{Eq. (6)}$$

where:

$$E_{FUx}=(E_{SA}*\#SA_x)+(E_S*\#S_x)$$
$$E_{FUy}=(E_{SA}*\#SA_y)+(E_S*\#S_y)$$

where the $E_{FUx}$ is the energy consumed by the activation of the FU due to the instructions of Soft-SIMD on x and the $E_{FUy}$ due to the instructions of Soft-SIMD on y. In order to estimate the total energy consumed, the above energies should be multiplied by the total number of activations, respectively. It should be stressed once again that the operations performed in one iteration of the loop are derived from the scheduling of the tool, as illustrated in FIG. 30. But the operations that are responsible for the addressing of the operands and the load and store instructions have been excluded because these are executed on a separate Address Generation Unit (AGU) unit.

Removing the load store instructions and applying a scheduling that takes into account the registers R3 and R4 the scheduling of the multiplication loop is illustrated in Table VIII.

TABLE VIII

Initial scheduling of the multiplication loop on GSAS FU for mapping of the Soft-SIMD

| | Soft-SIMD on x | |
|---|---|---|
| 1 | MulRes0__8__a=GSA1(imsub__8[x−1][y],imsub__8[x+1][y]) | |
| 2 | MulRes0__8__b=GSA1(imsub__8[x+5][y],imsub__8[x+7][y]) | MulRes0__16__a=REPACK(MulRes0__8__a) |
| 3 | | MulRes0__16__b=REPACK(MulRes0__8__a) |
| 4 | | MulRes0__16__c=REPACK(MulRes0__8__b) |
| 5 | | MulRes0__16__d=REPACK(MulRes0__8__b) |
| 6 | | MulRes0__12__a=REPACK(MulRes0__8__a) |
| 7 | MulRes7__12__a=GSA1(MulRes0__12__a,MulRes0__12__a) | MulRes0__12__b=REPACK(MulRes0__8__a,MulRes0__8__b) |
| 8 | MulRes7__12__b=GSA1(MulRes0__12__b,MulRes0__12__b) | MulRes0__12__c=REPACK(MulRes0__8__b) |
| 9 | | MulRes7__16__a=REPACK(MulRes7__12__a) |
| 10 | MulRes7__12__c=GSA1(MulRes0__12__c,MulRes0__12__c) | MulRes7__16__b=REPACK(MulRes7__12__a,MulRes7__12__b) |
| 11 | MulRes7__16__a=GSA1(MulRes7__16__a,MulRes0__16__a) | MulRes7__16__c=REPACK(MulRes7__12__b,MulRes7__12__c) |
| 12 | MulRes7__16__b=GSA1(MulRes7__16__b,MulRes0__16__b) | MulRes7__16__d=REPACK(MulRes7__12__c) |
| 13 | MulRes7__16__c=GSA1(MulRes7__16__c,MulRes0__16__c) | |
| 14 | MulRes7__16__d=GSA1(MulRes7__16__d,MulRes0__16__d) | |
| 15 | MulRes7__16__a=GSA1(MulRes7__16__a,MulRes0__16__a) | |
| 16 | MulRes7__16__b=GSA1(MulRes7__16__b,MulRes0__16__b) | |
| 17 | MulRes7__16__c=GSA1(MulRes7__16__c,MulRes0__16__c) | MulRes7__12__a=REPACK(MulRes7__16__a,MulRes7__16__b) |
| 18 | MulRes7__16__d=GSA1(MulRes7__16__d,MulRes0__16__d) | MulRes7__12__b=REPACK(MulRes7__16__b,MulRes7__16__c) |
| 19 | Load from vwr imsub8[x][y] to R1 | MulRes7__12__c=REPACK(MulRes7__16__c,MulRes7__16__d) |
| 20 | Load from vwr imsub8[x+6][y] to R2 | imsub__12__a=REPACK(imsub__8[x][y]) |
| 21 | | imsub__16__a=REPACK(imsub__8[x][y]) |
| 22 | | imsub__12__b=REPACK(imsub__8[x][y],imsub__8[x+6][y]) |
| 23 | | imsub__16__b=REPACK(imsub__8[x][y],imsub__8[x+6][y]) |

TABLE VIII-continued

Initial scheduling of the multiplication loop on GSAS FU for mapping of the Soft-SIMD

| | |
|---|---|
| 24 | imsub_16_c=REPACK(imsub_8[x][y],imsub_8[x+6][y]) |
| 25 | imsub_12_c=REPACK(imsub_8[x+6][y]) |
| 26 MulRes4_12_a=<br>GSA1(imsub_12_a,imsub_12_a) | imsub_16_d=REPACK(imsub_8[x+6][y]) |
| 27 MulRes4_12_b=<br>GSA1(imsub_12_b,imsub_12_b) | |
| 28 MulRes4_12_c=<br>GSA1(imsub_12_c,imsub_12_c) | |
| 29 MulRes4_12_a=<br>GSA1(MulRes4_12_a,imsub_12_a) | |
| 30 MulRes4_12_b=<br>GSA1(MulRes4_12_b,imsub_12_b) | MulRes4_16_a=REPACK(MulRes4_12_a) |
| 31 MulRes4_12_c=<br>GSA1(MulRes4_12_c,imsub_12_c) | MulRes4_16_b=<br>REPACK(MulRes4_12_a,MulRes4_12_b) |
| 32 MulRes4_16_a=<br>GSA1(MulRes4_16_a,imsub_16_a) | MulRes4_16_c=<br>REPACK(MulRes4_12_b,MulRes4_12_c) |
| 33 MulRes4_16_b=<br>GSA1(MulRes4_16_b,imsub_16_b) | MulRes4_16_d=<br>REPACK(MulRes4_12_c) |
| 34 MulRes4_16_c=<br>GSA1(MulRes4_16_c,imsub_16_c,0x60) | MulRes4_12_a=<br>REPACK(MulRes4_16_a,MulRes4_16_b |
| 35 MulRes4_16_d=<br>GSA1(MulRes4_16_d,imsub_16_d,0x60) | MulRes4_12_b=<br>REPACK(MulRes4_16_b,MulRes4_16_c |
| 36 imgauss_x[x][y]=<br>GSA1(MulRes7_12_a, MulRes4_12_a) | MulRes4_12_c=<br>REPACK(MulRes4_16_c,MulRes4_16_d) |
| 37 imgauss_x[x+4][y]=<br>GSA1(MulRes7_12_b, MulRes4_12_b) | |
| 38 imgauss_x[x+8][y]=<br>GSA1(MulRes7_12_c, MulRes4_12_c)<br>Soft-SIMD on y | |
| 1 MulRes2=GSA1(imgauss_x[x][y-1],<br>imgauss_x[x][y-1]) | |
| 2 MulRes5=GSA1(imgauss_x[x][y-2],<br>imgauss_x[x][y]) | |
| 3 imgauss[x][y-1]=GSA1(MulRes2,MulRes5) | |

The energy estimation of the FUs of the architecture with 1 data cluster and two slots for the multiplication loop is depicted in FIG. 31.

The LB energy is estimated by the pessimistic approach. The $E_{RSAS}$ is the required energy for reading one instruction from the LB, respectively. The energy for reading one instruction is calculated by multiplying the energy consumed when reading one Flip Flop (FF) ($E_{FF}$=5 fJ) by the number of required FFs for storing the instruction, e.g. the width of the instruction W. The $W_S$ and $W_{SA}$ represent the necessary control bits for each instruction, e.g. 6 bits for the SA and 4 bits for the shuffler. In order to estimate the total energy consumed by the LB, the consumed energy of each instruction should be multiplied by the total number of reads. It should be stressed that while unrolling the operations the LB reads are not increasing, due to the fact that the same instruction is applied to different data. Applying again the pessimistic approach results in Equation (Eq. 7).

$$E_{LB}=E_{LBx}+E_{LBy} \quad \text{Eq. (7)}$$

where:

$E_{LBx}=E_{LBpessx}$
$E_{LBx}=E_{LBpessy}$
$E_{LBpessx}=(E_{FF}*(W_{SA}+W_{SF})*LB_{depth}*\#SAS_x$
$E_{LBpessy}=(E_{FF}*(W_{SA}+W_{SF})*LB_{depth}*\#SAS_x$ The energy estimation of the LB the architecture with 1 data cluster and two slots for the multiplication loop is depicted on FIG. 32.

Finally, an estimation of the energy gain for the whole detection algorithm due to the bit true and approximate optimizations is performed.

The estimation for the data path energy consumption of the detection algorithm is performed, as an example only, for the mapping of the detection algorithm to the ASIP-VLIW with one data cluster and two slots per data cluster. The data path energy of the processor comprises the energy that the FUs are consuming and the consumed energy of the LB, which stores the control bits of the FUs. In one embodiment, the background and foreground data memory operations and the instructions corresponding to address computation are not taken into account.

A similar methodology as the one that has been applied for the energy estimation of the multiplication loop can be also applied for the data path energy estimation of the detection algorithm. Assuming 40 nm TSMC technology, a clock with frequency equal to 200 MHz and a data path width equal to 16 bits. Then, Table IX illustrates the energy that each FU consumes.

TABLE IX

Power and energy consumption of different FUs

| FU | Power per activation (μW) | Energy per activation (fJ) |
|---|---|---|
| Multiplier | 810 | 4050 |
| Adder | 45 | 225 |
| Shifter | 20 | 100 |
| SA | 100 | 500 |
| GSAS | 180 | 900 |

The FU energy can be estimated by Equation (Eq. 3) taking into account the whole program code of the detection algorithm. The consumed energy is approximated by the most dominant part of the program code which is the loops that iterate through the whole image, as it is illustrated in FIG. 33.

Figure 34:
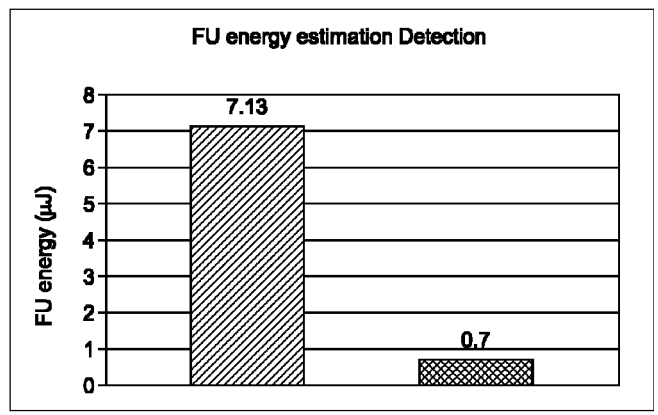
FIG. 34 illustrates FU energy comparison of the original detection algorithm implemented to multiplier FU and transformed detection algorithm implemented to SA FU.

The energy estimation of the FUs of the architecture with 1 data cluster and two slots for detection algorithm is depicted in FIG. 34.

Figure 35:
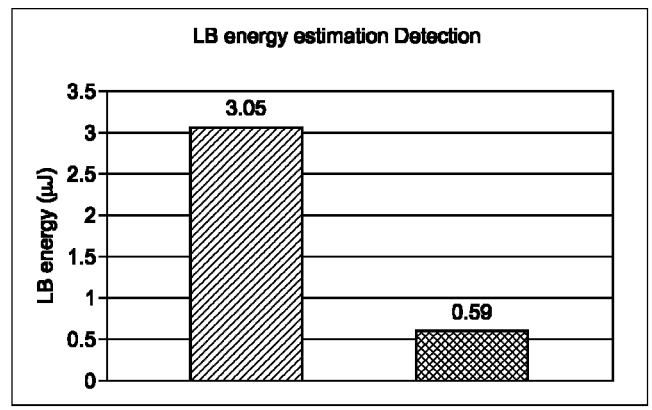
FIG. 35 illustrates LB energy comparison of the original detection algorithm implemented to multiplier FU and transformed detection algorithm implemented to SA FU.
Figure 36:
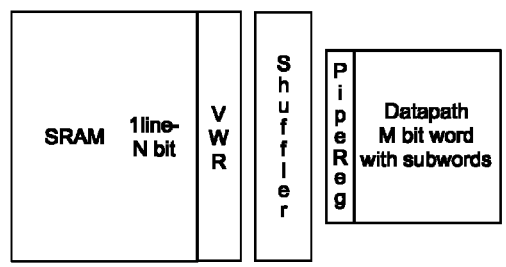
FIG. 36 illustrates a main option for organization of a data-parallel data path according to embodiments of the present invention, in a simulation environment including storage optimization.

The LB energy is estimated again by the pessimistic approach where it is assumed that the read energy is proportional to the depth of the LB and it can be calculated by Equation (5). The energy estimation of the LB for the architecture with 1 data cluster and two slots for the detection algorithm is depicted in FIG. 35.

In a further aspect, the present invention provides a way to effectively retrieve/send 2D array data from and to background memory from a data-path that is organized in a data-parallel way using the soft-SIMD approach according to embodiments of the present invention. The background memory access passes through a very wide register (VWR) foreground memory organization and requires also a flexible shuffler to be present in the data-path. The SRAM requirements in the background memory organization are quite domain-specific also so a partly customized SRAM module may be advantageous to reach ultra-low energy results. Alternatively, the use of a conventional SRAM module is feasible but will require a significant performance and energy overhead.

When using a data parallel (SIMD, vector, sub-word) approach in the processor data-path, the sub-words should also be fetched from and written back to the background memory (typically SRAM in the L1 layer) in a data parallel way. Otherwise, the main advantage of using the latter is largely lost. So wider data needs to be fetched from the small- to medium-size L1 SRAM. When ultra low energy applications are focused, the need for a wide word is even stronger, because a significant part of the total read and write energy is "lost" in the periphery overhead in such small SRAMs. In particular, this can be up to 50% for a 32-bit word access in a 32-64 Kbit SRAM.

Hence, there is a need for a scheme where the access to the SRAM is heavily reduced, i.e. by introducing very wide accesses, much wider than the data-path itself.

The basic schedule would look as follows:

```
For i= 1 to K Do
{
    Read line from SRAM to VWR
    For j= 1 to N/M Do
    {
        Read word(s) from VWR to data path
        Operate on word (can be several cycles, using pipe-regs)
        Potentially shuffle bits inside word
        Write word back to VWR
    }
    Write line from VWR to SRAM
}
```

However, that is not enough to access a 2D array (or any higher dimension) when a mix of row and column directions is required. In particular when a part of the algorithm traverses the 2D array row-wise, the wide line needs to be organized in terms of words in a row (data layout 1). However, when later on a part of the algorithm requires a column-wise traversal, the words have to be organized along columns (data layout 2). Obviously, these two data layouts are not compatible with each other, and there is a need of the equivalent of a 2D transpose in between the two algorithmic parts. It is to be noted that in the "sequential" case (exploiting only instruction-level parallelism), such a transpose would not be needed as the words are loaded sequentially from the SRAM. And the order of the sub-words inside each word can be corrected by means of the internal data-path shuffler.

That transpose (on a sub-word basis) is now illustrated for a 4*4 subarray operating on 8-bit data:

w00b0 . . . w00b7 w01b0 . . . w01b7 w02b0 . . . w02b7 w03b0 . . . w03b7
w10b0 . . . w10b7 w11b0 . . . w11b7 w12b0 . . . w12b7 w13b0 . . . w13b7
w20b0 . . . w20b7 w21b0 . . . w21b7 w22b0 . . . w22b7 w23b0 . . . w23b7
w10b0 . . . w30b7 w31b0 . . . w31b7 w32b0 . . . w32b7 w33b0 . . . w33b7 should become:

w00b0 . . . w00b7 w10b0 . . . w10b7 w20b0 . . . w20b7 w30b0 . . . w30b7
w01b0 . . . w01b7 w11b0 . . . w11b7 w21b0 . . . w21b7 w31b0 . . . w31b7
w02b0 . . . w02b7 w12b0 . . . w12b7 w22b0 . . . w22b7 w32b0 . . . w32b7
w03b0 . . . w03b7 w13b0 . . . w13b7 w23b0 . . . w23b7 w33b0 . . . w33b7

A scheme is now proposed in accordance with embodiments of the present invention, to efficiently enable such a transpose for the data-parallel case.

As motivated above, it would be advantageous to have a scheme where the data-path is combining a number of sub-words into a word, of e.g. 48 bit. And then an SRAM interface is needed of e.g. 576 bit (12 times wider), i.e. with a complete "line". That is one of the advantageous components of the scheme according to embodiments of the present invention, see also FIG. 37.

However, in between the data-path and the background memory, a foreground memory needs to be plugged as a "buffer" to compensate for the unequal read and write access sequences. Conventional multi-port register-files will not provide a really low-energy access, so instead it is proposed in accordance with embodiments of the present invention to utilize very wide registers (VWRs) of e.g. 576-bit wide, that have 1-port cells but multiple external ports of e.g. 48 bit to the data-path. This asymmetrical interface allows to convert the relative small size of the data-path effectively to a very wide SRAM interface. The VWR can be pitch-matched to the output lines of the SRAM, and can even replace the conventional in/out buffers, allowing to save even more energy.

Finally, also an operator is needed to reorganize the words in the line. For this purpose, according to embodiments of the present invention, the shuffler that is anyway needed already to reorganize the sub-words in the word will be reused. In one embodiment, it will be assumed that this shuffler is 576-bit wide also and that it is positioned next to the VWR, in a pitch-matched way. That shuffler is then also taking care of the selection of specific VWR words to the data-path itself. Typically the data-path will then also contain an M-bit wide pipeline register to buffer the required data. Obviously, only a very small subset of all 576 to 576 crossbar connections are needed in that case. In practice, only the fully regular and relatively "local" reshuffles will be exploited. Those are namely sufficient for the purpose of embodiments of the present invention. In the illustration further on only a maximal shuffling scope of 72 bit out of the 576-bit total width is needed.

Figure 37:
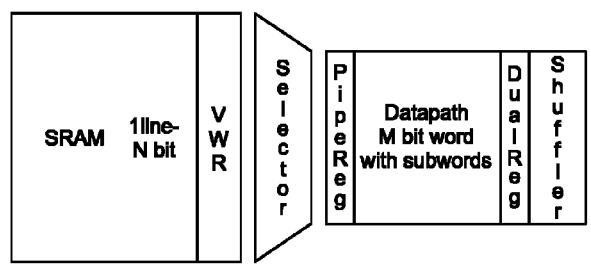
FIG. 37 illustrates an alternative embodiment of the present invention for organization of a data-parallel datapath, in a simulation environment including storage optimization.

An alternative scheme according to embodiments of the present invention is provided in FIG. 37. In that case, the smaller shuffler (M bit wide) that needs to be available in the data-path itself for the intra-word shuffling has been reused.

The disadvantage is now that several cycles are needed to perform the inter-word shuffling between the data-path and the VWR, namely N/M cycles. It is to be noted, however, that this is only feasible without additional cycle overhead (above N/M) when 2 input registers containing "neighboring" words, are provided to the shuffler.

The most promising and energy-efficient option to realize the above requires a modification in the write hardware of the SRAM. In particular, it is required to be able to write both in the conventional way along the rows (576-bit wide) but in addition also along part of the column direction (e.g. 72-bit wide). That column direction should actually be internally broken up into chunks of $size_{LBL}$, e.g. 9 times $size_{LBL}$ bit. This necessitates a change at least inside the SRAM connection scheme. It is not desired to modify the internal cells and the local bit line (LBL) organization because that would require a complete redesign and re-characterization. Instead, it is assumed that the LBL still comprises 8 cells (and hence 8 bit) and that that layout and circuit are reused "as is". But the LBL access organization is modified to allow selecting which LBL of the 72 bit column is actually being written to. Then only the postdecoder and the related selection lines have to be modified. This is feasible with little delay and area overhead, and hence also the basic energy cost remains largely the same. Still, the total energy for writing a 576 VWR line along the column direction now definitely goes up because it needs to be broken up into multiple cycles with each a significant peripheral energy penalty. That energy cost is, however, only needed rarely as the transpose operations only need to be activated between parts of the algorithm that switch between row and column-wise access. By applying the appropriate program code transformations, it is assumed that these points can be heavily minimized.

There also is one more problem to solve though. When a switching between rows and columns is performed in that way, the bits inside the sub-words are also transposed. Obviously, that is not the intention. So to avoid this, each of the individual bit positions of the WL bit sub-words are distributed over WL partitions. In particular, all least significant bits are grouped in the LSB partition, and so on. Within each partition, the row-column transpose can then be performed safely. And at the end the above distribution has to be undone again to compose the original sub-words. This means the number of partitions depends on the WL. In the remainder of this subsection, we WL=8 bit will be assumed when practical illustrations are needed. But the scheme itself is scalable to other WL sizes too, as long as they are not too large and that they form a divisor of the line size divided by the local bit line size, i.e. a divisor of $N/size_{LBL}$, which is 72 bit in the illustration. It is to be noted also that the SRAM should internally be divided into partitions, preferably a multiple of WL, i.e. 8 in the illustration. And the modified (customized) postdecoder should distribute the 72 bit segments in the appropriate way over the parallel partitions, i.e. 9 bit per partition in our illustration.

The shuffler should have a scope of $N/size_{LBL}$ bit in order to organize the bits matching the above column-row transpose requirements. And each segment of 72 bit is then written at the appropriate position of the $size_{LBL}$ local bit line units, sequenced over $size_{LBL}$ cycles in the illustration. It is to be noted that the reshuffled positions of the individual bits have to be determined by a reverse engineering of the way the actual column-row transpose operates in the above scheme. In the illustration, there are originally 72 bits with 9 sub-words of 8 bit. After the reshuffle these should be organized in WL=8 partitions with the 9 LSBs, followed by the 9 (LSB+1)s, etc.

The address sequencing for the writes happens in segments of $N/size_{LBL}$=72 bit, and this sequentially across the 8 bit positions of every LBL. So also the read sequence afterward should follow that same sequence inside the LBLs to avoid a wrong interpretation. But the interleaving of the bits in the write and read phase should be transposed. That is up to the AGU programming. It is to be noted, however, that this addressing scheme is quite regular, despite its seeming complexity for the generic (symbolic) case as described here.

Finally, the assumption has been made here that only the writes require such a transpose. It would indeed be very costly if the sense amplifiers in the read organization have to be messed with. Fortunately, by an appropriate program code transformation in the algorithm, it will always be feasible to read the sub-words in the row-wise order, as long as they have been written column-wise in either the normal or the transposed order. Hence, the above proposal should be sufficiently generic to handle all practical cases.

The schedule including the transpose would now look as follows (for WL=8 bit, N=576 bit, M=48 bit, $size_{LBL}$=8 bit, segment size=72 bit):

```
for i= 1 to K Do
{
    Read line from SRAM to VWR
    for j= 1 to N/M Do
    {
        Read word(s) from VWR to data path
        Operate on words in row-wise direction (can be several cycles,
        using pipe-regs)
        Potentially shuffle bits inside word
        Write word back to VWR
    }
    Shuffle the sub-words in the line so that each bit (e.g. LSBs) is
    grouped into WL=8 separate partitions in that line (can be multiple or
    single cycle depending on which shuffler is present in data-path).
    Write line from VWR to SRAM in column direction by using 8
    cycles where each time 72 bit are written in 8 partitions of 9 LBLs.
    Read lines from SRAM to VWR in row direction across 8 partitions
    with 576 bit wide line access (1 cycle).
    Shuffle the sub-words in the line so that each bit (e.g. LSBs) is again
    positioned at appropriate alignment in its sub-word (can be multiple
    or single cycle depending on which shuffler is present in data-path).
    for k= 1 to N/M Do
    {
        Read word(s) from VWR to data path
        Operate on words in column-wise direction (can be several
        cycles, using pipe-regs)
        Potentially shuffle bits inside word
        Write word back to VWR
    }
}
```

In summary, according to embodiments of the present invention, the domain-specific data-path of the ASIP is best extended with a domain-specific SRAM module.

Distributed Decoder Loop Buffer Architecture

In a further aspect of embodiments of the invention, architectural extensions provide a way to reduce the energy consumption in the instruction memory hierarchy of the processor, while still keeping program code size as well as performance optimal.

Figure 43:
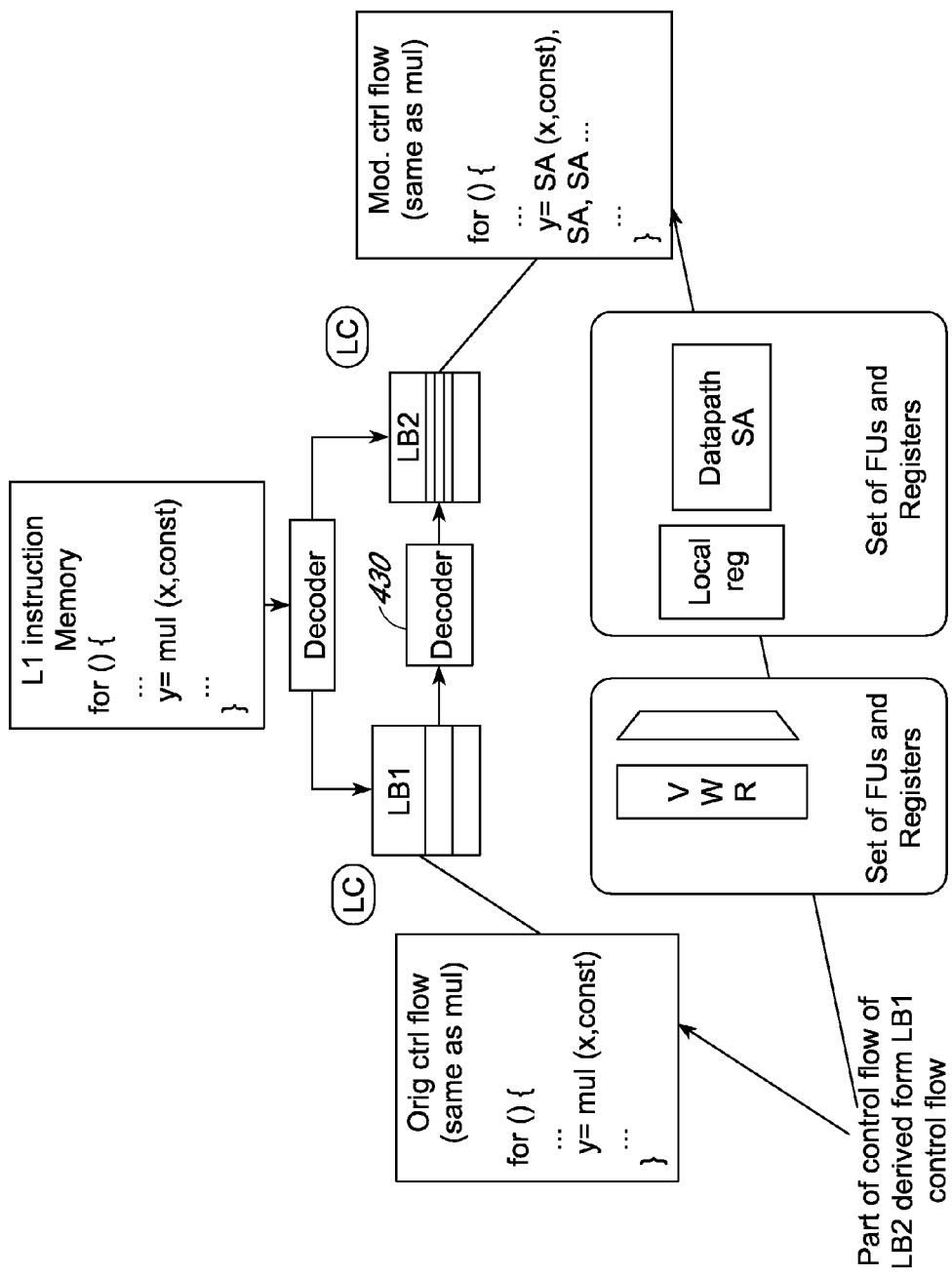
FIG. 43 illustrates an architecture according to one embodiment of the present invention.

An architecture according to embodiments of the present invention is shown in FIG. 43. An extra decoder 430 at the lowest level is situated between the different loop buffers LB1, LB2. The decoding performed by this extra decoder 430 is pure translation of a part of a set of instructions stored in one loop buffer LB1 to another set of instructions in the other loop buffer LB2. Both these loop buffers LB1, LB2, however, are organized at the same level (not hierarchical) and would contain the program code which can be used to control the different registers and FUs corresponding to that Loop buffer.

This can be illustrated using an example: Consider the case where the number of and the precise 'instructions'/microinstructions in LB2 are dependent on data x, whereas x does not affect the number of and the precise 'instructions' in LB1. This implies the control structure in LB1 is independent of x and after decoding 'x' a control structure for LB2 can be obtained.

Example

Assume the original program code is as follows:

```
for(i=0, i<N...) {
    c = mul(x, y);
}
```

The control structure for LB1 does not depend on x or y as data elements:

```
For(i=0;i<N...) {
    load x, R1;
    load y, R2;
    R3 = mul (R1, R2);
    store R3;
}
```

On the other hand, for LB2, the multiply operation has to be converted to a series of shifts and adds. However, the exact number of shifts and adds depends on the precise value of x. One possible control for LB2 could be:

```
for(i=0;i<N...) {
    load x, R1;
    load y, R2;
    RT1 = add (R1, 4);
    RT1 = add (RT1, 2);
    R3 = shift (RT1, 2);
    store R3;
}
```

In a particular embodiment of the invention, more complex schemes are possible where the decoding of program code in the LB2 is done at run-time for each iteration of the loop if the values (and therefore the control in LB2) changes every iteration.

Experiment and Test Results

A heavily optimized ASIP architecture has been provided in accordance with embodiments of the present invention, with low-cost ultra low-energy consumption while still meeting all the performance requirements. The performance gain for the Gauss filtering loop of the biotechnology application mentioned before is illustrated in FIG. 38.

Figure 38:
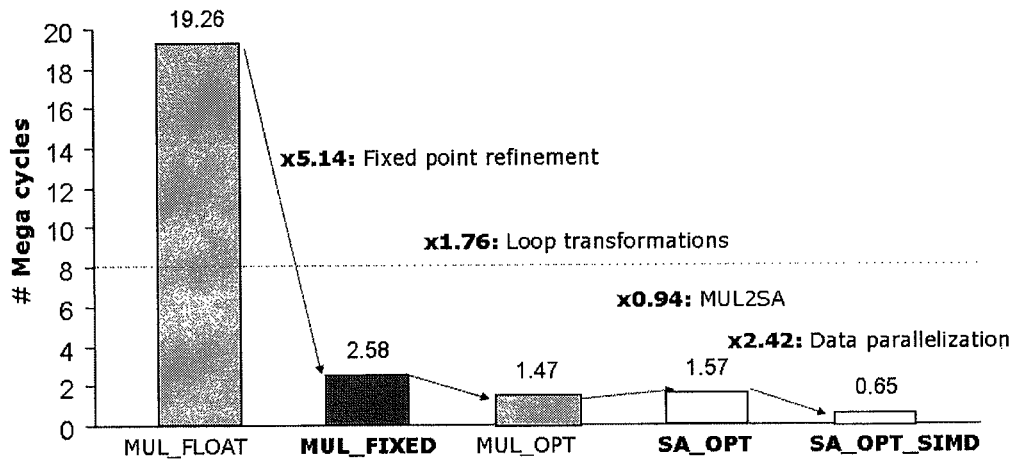
FIG. 38 illustrates performance of a multiplication loop for the different implementations.

Observing the results of FIG. 38, the obtained performance gain due to quantization techniques that lead to the fixed point refinement of the multiplication loop is equal to 5.14. The application of bit true program code transformations in order to reduce the number of the constant multiplications and furthermore to reduce the number of shift and addition operations, has a performance gain equal to 1.76. The conversion from constant multiplications to shift and addition operations does not have a great impact on performance, while it will enable the application of Soft-SIMD and the significant reduction of the energy consumption, especially in the instruction and data memory hierarchies. Finally, the enabling of data parallelization due to Soft-SIMD has as result a further gain factor of 2.42. The total performance gain for the constant multiplication loop is actually equal to 29.63. Energy gains are expected by fully avoiding the multiplication operations. The data path energy estimation of the processor with one data cluster and two slots per data cluster is depicted in FIG. 39.

Figure 39:
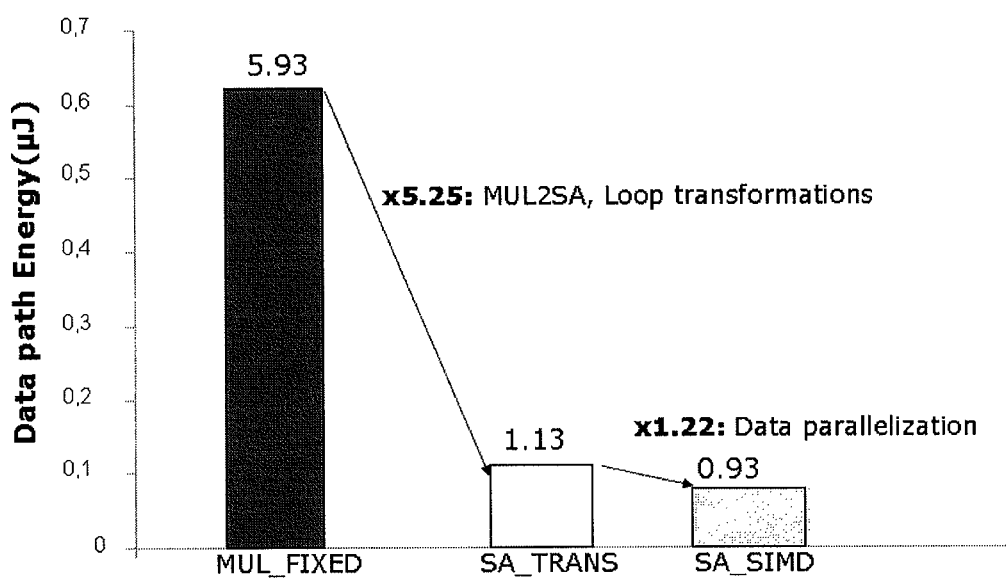
FIG. 39 illustrates data path energy consumption of the multiplication loop for the different implementations.

Observing the results of FIG. 39, the obtained energy gain of the data path of the processor due to the conversion from fixed-point constant multiplications to shift and addition operations, while applying program code transformations in order to reduce the number of the constant multiplications and to reduce the number of shift and addition operations, has resulted in a gain equal to 5.25. Finally, the enabling of data parallelization due to Soft-SIMD has as result an additional gain factor of 1.22. The latter is however an underestimate because several pessimistic estimates have been included here, and the main expected gain is situated in the data-memory organization. The reference for this is an already optimized fixed-point version where the word-lengths have been heavily optimized compared to the initial 64-bit floating point version.

Figure 40:
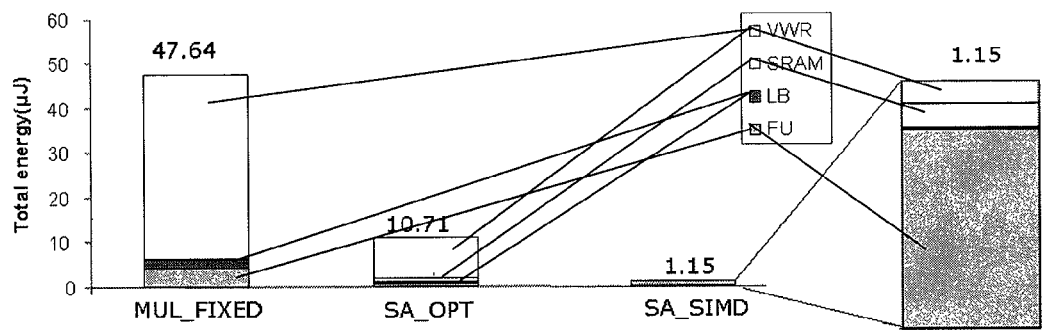
FIG. 40 illustrates total energy estimation of the Gauss loop for the implementation with multiplier, SA and Soft-SIMD.

A first estimate of the energy in the SRAM and VWR based on an initial and on an optimal scheduling on the Shift-Add-Shuffler FU leads to the total energy that is depicted on FIG. 40.

The obtained energy gain of the processor due to the conversion from fixed-point constant multiplications to shift and addition operations, while applying program code transformations in order to reduce the number of the constant multiplications and to reduce the number of shift and addition operations, has resulted in a gain equal to 4.45. Finally, the enabling of data parallelization due to Soft-SIMD has as result an additional gain factor of 9.31. The data path energy is clearly dominant now compared to the energy consumption of the data background memory and the VWR foreground memory for the Soft-SIMD. It is to be noted that also the instruction memory overhead (the loop buffer mainly) represents only 0.08% of the total energy.

Furthermore, the conversion of constant multiplications to shift and addition operations has been performed for the whole detection algorithm. More generic Functional Units (FUs) that implement the sequences of shift and add operations have been introduced in order to be able to integrate the whole detection algorithm. This has enabled to also convert costly operations like division, square root and trigonometric functions. Also here, a thorough exploration of the most promising ASIP architectures, which can integrate the biotechnology application, has been performed. The overall performance gain for the detection algorithm of the biotechnology application is illustrated in FIG. 41.

Figure 41:
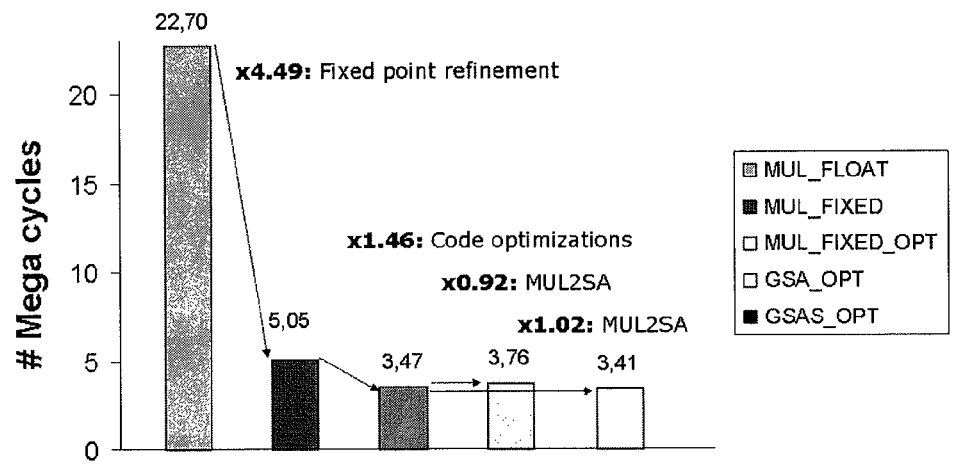
FIG. 41 illustrates performance of a full detection algorithm for the different implementations.

Observing the results of FIG. 41, the obtained performance gain due to quantization techniques is equal to 4.5. The conversion from constant multiplications to shift and addition operations and the mapping of the detection algorithm to GSAS FU, while applying bit true program code transformations, such as multiple precision multiplier and Look Up Tables, has a performance gain equal to 1.46. Finally, the total performance gain is equal to 6.66. Based on the experiments of the multiplication loop, it is expected that the enabling of data parallelization due to Soft-SIMD will lead to even better performance gains. The detection algorithm that uses the multiplier FU has ⅙ of the total operations equal to multiplication operations. By reducing the required multiplication operations to a small number that is implemented in a 4 bit multiplier further energy gains are expected. The data path energy estimation of the processor with one data cluster and two slots per data cluster is depicted in FIG. 42.

Figure 42:
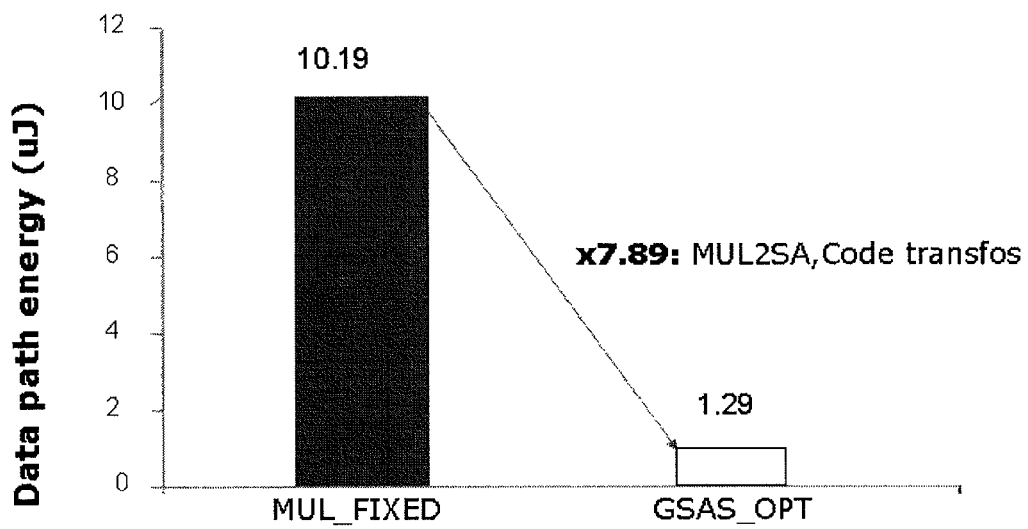
FIG. 42 illustrates data path energy estimation of the full detection algorithm for the different implementations.

Observing the results of FIG. 42, the obtained energy-gain of the data path of the processor due to the conversion from constant multiplications to shift and addition operations, while applying program code transformations in order to reduce the number of the multiplications is equal to 7.89. Finally, based on the experiments of the constant multiplication loop the enabling of data parallelization due to Soft-SIMD will lead to further energy savings.

From the above it is clear that the original Matlab code which could only run on a general purpose computer to achieve real-time operation, has now been converted to a heavily optimized C code with intrinsics mapped to an ultra-low energy ASIP processor. The energy efficiency of the dominant part of detection algorithm is about 1217 MOPS/mW for an estimated 40 nm TSMC implementation, regarding the Soft-SIMD data-path including the instruction memory overhead. A first estimate of the energy in the SRAM and VWR leads to the conclusion that those contributions are smaller, namely only 13% extra overhead. That would bring the energy efficiency for the entire processor using the Soft-SIMD to an 983 MOPS/mW. The latter still achieves real-time with a clock frequency of about 100 MHz or with a 50% duty-cycles clock frequency of 200 MHz. This clearly enables, as an example only, a battery-operated mobile system with long life time for the on-line animal tracking system.

Figure 44:
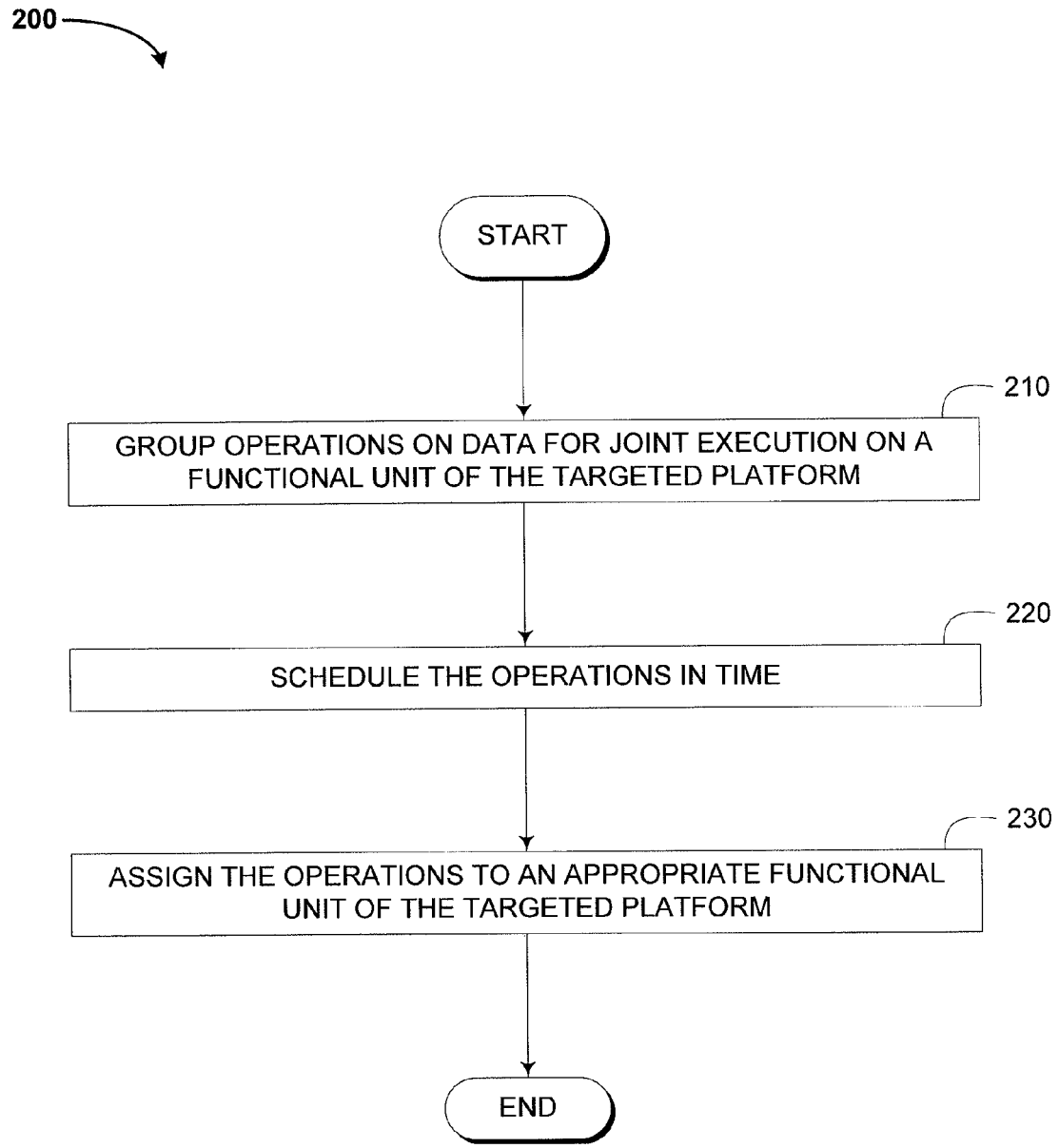
FIG. 44 shows a flowchart of one embodiment of a method of converting a first program code into a second program code.

FIG. 44 shows a flowchart of one embodiment of a method of converting a first program code into a second program code, such that the second program code has an improved execution on a targeted programmable platform. The method 200 starts at a block 210, wherein operations on data are grouped for joint execution on a functional unit of the targeted platform. Moving to a block 220, the operations are scheduled in time. Next at a block 230, the operations are assigned to an appropriate functional unit of the targeted platform. In one embodiment, detailed word length information is used in at least one of the grouping, scheduling or assigning operations.

Figure 45:
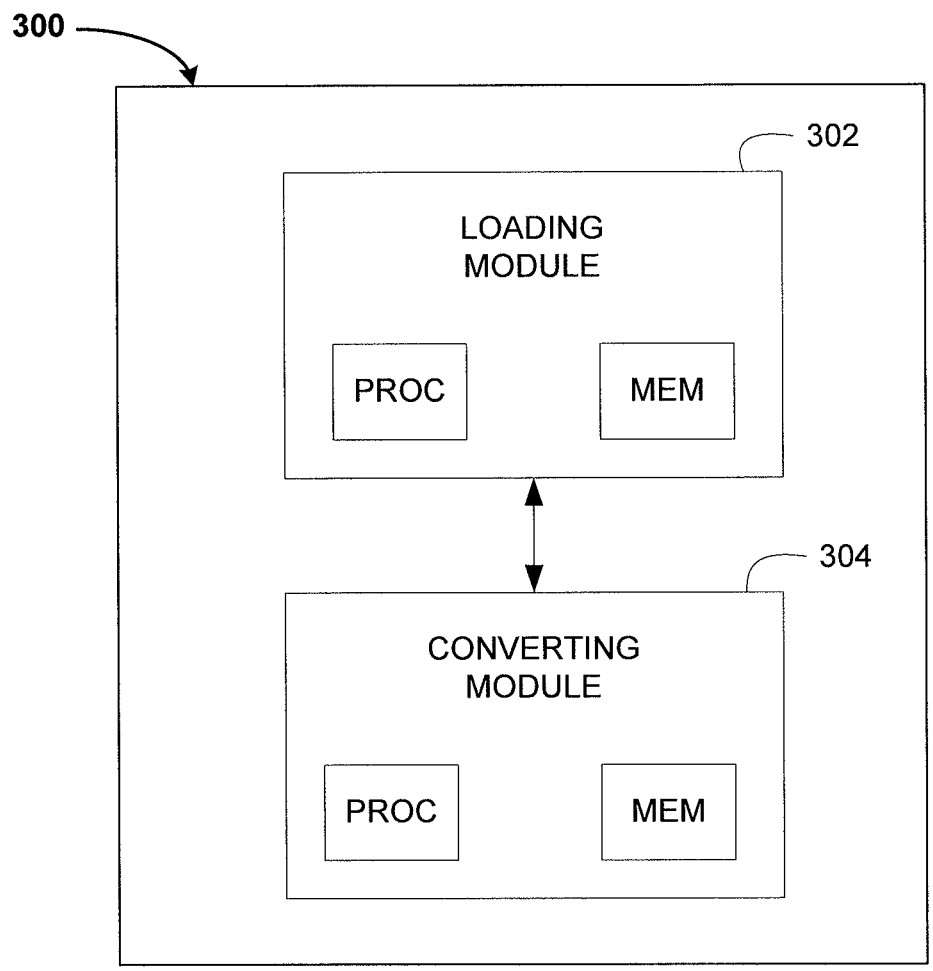
FIG. 45 shows a block diagram illustrating one embodiment of a system for converting a first program code into a second program code on a computer environment.

FIG. 45 shows a block diagram illustrating one embodiment of a system for converting a first program code into a second program code on a computer environment, such that the second program code has an improved performance and/or lower energy consumption on a targeted programmable platform than the first program code. The program codes represent an application. The system 300 comprises a loading module 302 configured to load on the computer environment the first program code and, for at least part of variables within the program code, the word length required to have the precision and overflow behavior as demanded by the application. The system 300 may further comprise a converting module 304 configured to convert the first program code into the second program code by grouping operations of the same type of variables for joint execution on a functional unit of the targeted programmable platform. The grouping operations use the required word length. The functional unit supports one or more word lengths. The grouping operations are selected to use at least in part one of the supported word lengths.

In one embodiment, the loading module and/or the converting module may optionally comprise a processor and/or a memory. In another embodiment, one or more processors and/or memories may be external to one or both modules. Furthermore, a computing environment may contain a plurality of computing resources which are in data communication.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of converting a first program code into a second program code, such that the second program code has an improved execution on a targeted programmable platform, the method comprising:
   grouping operations on data for joint execution on a functional unit of the targeted platform;
   scheduling the operations in time;
   assigning the operations to an appropriate functional unit of the targeted platform, wherein detailed word length information is used in at least one of the grouping, scheduling or assigning operations, and wherein the process of scheduling and assigning comprises scheduling and assigning at least one multiplication operation comprising a right shift operation; and
   implementing a software single instruction multiple data (SIMD) instruction by adding guard data to the data such that joint operation on the data is not jeopardizing the correctness of the data, wherein implementing the software single instruction multiple data (SIMD) instructions comprises:
  inserting a single guard bit between a least significant bit of a first sub-word and a most significant bit of a second sub-word, the first sub-word and the second sub-word packed together and part of the software single instruction multiple data (SIMD) instruction;
  discarding a first number of least significant bits of the first sub-word; and
  applying the right shift operation to the first sub-word by shifting the first sub-word to the right by the first number of bits.

2. The method according to claim 1, wherein the process of scheduling and assigning comprise scheduling and assigning at least one multiplication operation such that it is converted into at least one of add/subtract and/or shift operations or combinations thereof.

3. The method according to claim 1, further comprising packing different variables with small word lengths into one packed word.

4. The method according to claim 1, further comprising, for the conversion of first program code into second program code, clustering different run-time scenarios into a smaller set of different scenarios.

5. The method according to claim 1, further comprising reconfiguring the targeted programmable platform with a configuration parameter determined during design time, the particular configuration parameter being selected depending on the required detailed word length information.

6. The method according to claim 1, wherein the method is performed by one or more computing devices.

7. A system for converting a first program code into a second program code on a computer environment, the program codes representing an application, such that the second program code has an improved performance and/or lower energy consumption on a targeted programmable platform than the first program code, the system comprising:
  a loading module configured to load on the computer environment the first program code and, for at least part of variables within the program code, a word length required to have the precision and overflow behavior as demanded by the application;
  a converting module configured to convert the first program code into the second program code by grouping operations of the same type of variables for joint execution on a functional unit of the targeted programmable platform, the grouping operations using the required word length, the functional unit supporting one or more word lengths, the grouping operations being selected to use at least in part one of the supported word lengths;
  a scheduler configured to schedule and assign, prior to carrying out of the grouping operations, at least one multiplication operation comprising a right shift operation;
  a guard bit insertion unit configured to insert a single guard bit between a least significant bit of a first sub-word and a most significant bit of a second sub-word, the first sub-word and the second sub-word packed together and part of a software single instruction multiple data (SIMD) instruction;
  a shuffle function unit configured to discard a first number of least significant bits of the first sub-word; and
  a right shifter configured to apply the right shift operation to the first sub-word by shifting the first sub-word to the right by the first number of bits.

8. The system according to claim 7, further comprising a reconfiguration device configured to reconfigure the targeted programmable platform, the reconfiguring being based on required detailed word length information.

9. The system according to claim 7, wherein the scheduler is configured to schedule and assign, prior to carrying out of the grouping operations, at least one multiplication operation such that it is converted into at least one of add/subtract and/or shift operations or combinations thereof.

10. The system according to claim 7, further comprising a hardware module configured to enable avoidance of sub-word overlapping.

11. The system according to claim 10, wherein the hardware module comprises an insertion module configured to insert variant checking points into the program code, the insertion module being able to remove shifted bits when they are going to pass to another sub-word.

12. The system according to claim 7, further comprising at least one decoder configured to decode instructions between loop buffers.

13. The system according to claim 12, wherein the at least one decoder is configured to translate at least a part of the instructions stored in one loop buffer into another set of instructions in a second loop buffer.

14. The system according to claim 7, further comprising a controller configured to sense external conditions identifying a current scenario, and to select an implementation from a clustered set of scenarios.

15. The system according to claim 7, further comprising a computing device configured to execute at least one of the loading module and the converting module.

16. A system for converting a first program code into a second program code, such that the second program code has an improved execution on a targeted programmable platform, the system comprising:
  means for grouping operations on data for joint execution on a functional unit of the targeted platform;
  means for scheduling the operations in time; and
  means for assigning the operations to an appropriate functional unit of the targeted platform,
  wherein detailed word length information is used in at least one of the grouping, scheduling or assigning operations, and wherein the scheduling and assigning operations include at least one multiplication operation comprising a right shift operation; and
  means for implementing a software single instruction multiple data (SIMD) instruction by adding guard data to the data such that joint operation on the data is not jeopardizing the correctness of the data, wherein means for implementing the software single instruction multiple data (SIMD) instructions comprises:
    means for inserting a single guard bit between a least significant bit of a first sub-word and a most significant bit of a second sub-word, the first sub-word and the second sub-word packed together and part of the software single instruction multiple data (SIMD) instruction;
    means for discarding a first number of least significant bits of the first sub-word; and
    means for applying the right shift operation to the first sub-word by means for shifting the first sub-word to the right by the first number of bits.

* * * * *